(12) United States Patent
Kumar et al.

(10) Patent No.: US 12,525,219 B2
(45) Date of Patent: Jan. 13, 2026

(54) METHOD AND ELECTRONIC DEVICE FOR INTELLIGENTLY READING DISPLAYED CONTENTS

(71) Applicant: Samsung Electronics Co., Ltd., Suwon-si (KR)

(72) Inventors: Sumit Kumar, Bengaluru (IN); Barath Raj Kandur Raja, Bengaluru (IN); Vibhav Agarwal, Bengaluru (IN); Sourav Ghosh, Kolkata (IN); Yashwant Singh Saini, Alwar (IN); Himanshu Arora, Bengaluru (IN); Harichandana Bhogaraju Swarajya Sai, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 18/170,061

(22) Filed: Feb. 16, 2023

(65) Prior Publication Data

US 2023/0223008 A1    Jul. 13, 2023

Related U.S. Application Data

(63) Continuation of application No. PCT/KR2023/000511, filed on Jan. 11, 2023.

(30) Foreign Application Priority Data

Jan. 11, 2022 (IN) ............................ 202241001343
Jun. 1, 2022 (IN) ............................ 2022 41001343

(51) Int. Cl.
*G06F 40/30* (2020.01)
*G10L 13/047* (2013.01)
(Continued)

(52) U.S. Cl.
CPC .............. *G10L 13/10* (2013.01); *G06F 40/30* (2020.01); *G10L 13/047* (2013.01); *G10L 13/07* (2013.01);
(Continued)

(58) Field of Classification Search
CPC ...... G06F 3/0484; G06F 16/22; G06F 40/166; G06F 40/30; G06F 40/40; G06F 15/16;
(Continued)

(56) References Cited

U.S. PATENT DOCUMENTS 9,626,955 B2    4/2017    Fleizach et al.
9,767,789 B2    9/2017    Radebaugh
(Continued)

FOREIGN PATENT DOCUMENTS

EP    3 866 475 A1    8/2021
KR    10-2005-0080671 A    8/2005
(Continued)

OTHER PUBLICATIONS

Apple; Seeing AI—Talking Camera for Blind; https://apps.apple.com/us/app/seeing-ai-talking-camera-for-the-blind/id999062298.
(Continued)

*Primary Examiner* — Rayeez R Chowdhury
(74) *Attorney, Agent, or Firm* — Jefferson IP Law, LLP

(57) ABSTRACT

A method for intelligently reading displayed contents by an electronic device is provided. The method includes obtaining a screen representation based on a plurality of contents displayed on a screen of the electronic device. The method includes extracting a plurality of insights comprising at least one of intent, importance, emotion, sound representation and information sequence of the plurality of contents from the plurality of contents based on the screen representation. The method includes generating audio emulating the extracted plurality of insights.

18 Claims, 37 Drawing Sheets

(51) Int. Cl.
  *G10L 13/07* (2013.01)
  *G10L 13/10* (2013.01)
  *G10L 25/21* (2013.01)
  *G10L 25/30* (2013.01)
  *G10L 25/51* (2013.01)

(52) U.S. Cl.
  CPC .............. *G10L 25/21* (2013.01); *G10L 25/30* (2013.01); *G10L 25/51* (2013.01); *G10L 2013/105* (2013.01)

(58) Field of Classification Search
  CPC .......... G06F 16/25; G06F 16/35; G06F 16/36; G06F 16/9535; G06F 17/00; G06F 3/01; G06F 3/048
  See application file for complete search history.

(56) References Cited

U.S. PATENT DOCUMENTS

| | | | |
|---|---|---|---|
| 11,074,904 B2 | 7/2021 | Yang et al. | |
| 2008/0065627 A1 | 3/2008 | Ma et al. | |
| 2013/0054244 A1 | 2/2013 | Bao et al. | |
| 2014/0067397 A1* | 3/2014 | Radebaugh | G10L 13/08 704/E13.011 |
| 2014/0343950 A1* | 11/2014 | Simpson | G06F 16/9535 704/275 |
| 2017/0185581 A1* | 6/2017 | Bojja | G06V 30/19173 |
| 2017/0308267 A1* | 10/2017 | Kozloski | G06F 40/30 |
| 2018/0270183 A1* | 9/2018 | Wei | H04L 51/046 |
| 2018/0300542 A1* | 10/2018 | Waddell | G06V 30/387 |
| 2018/0302358 A1* | 10/2018 | Nambiar | H04L 67/55 |
| 2019/0221208 A1* | 7/2019 | Chen | G06F 3/167 |
| 2020/0035215 A1* | 1/2020 | Yang | G10L 25/30 |

FOREIGN PATENT DOCUMENTS

| | | |
|---|---|---|
| KR | 10-2019-0104941 A | 9/2019 |
| KR | 10-2021-0122070 A | 10/2021 |

OTHER PUBLICATIONS

Googleplay; Android Accessibility Suite; https://play.google.com/store/apps/details?id=com.google.android.marvin.talkback&hl=en_IN.
Apple; AudioTs; https://apps.apple.com/us/app/audiots/id1078710105.
Apple; Emoji Tones—emoji with sound—https://apps.apple.com/us/app/emoji-tones-emoji-with-sound/id1248502453.
World Health Organization; Assistive Technology; https://www.who.int/news-room/fact-sheets/detail/assistive-technology; May 18, 2018.
McCue; Elderly and Disabled Assistive Technology Market to Surpass 26 Billion by 2024; Forbes; https://www.forbes.com/sites/tjmccue/2017/03/21/elderly-and-disabled-assistive-technology-market-to-surpass-26-billion-by-2024/?sh=4bab3df269ea; Mar. 21, 2017.
World Health Organization; Eye care, vision impairment and blindness; https://www.who.int/health-topics/blindness-and-vision-loss#tab=tab_1.
Rico; A mobile App Dataset for Building Data-Driven Design Applications; https://interactionmining.org/rico.
Seyeditabari; Emotional Embeddings: Refining Word Embeddings to Capture Emotional Content of Words; https://arxiv.org/pdf/1906.00112.pdf; arXiv:1906.00112v2 [cs.CL] Jun. 19, 2019; Jun. 19, 2019.
Pennington; GloVe: Global Vectors for Word Representation; https://nlp.stanford.edu/projects/glove/.
Kadayet; Impact of Sentence-length on the Readability of Web for Blind Users; MAUU5900; Master Thesis in Universal Design of ICT; May 15, 2019.
International Search Report dated Apr. 20, 2023; International Appl. No. PCT/KR2023/000511.
Gya Rgy Wersa Nyi Ed—Sa Lvi Ystad et al., Auditory Representations of a Graphical User Interface for a Better Human-Computer Interaction, May 18, 2009, Auditory Display, Springer Berlin Heidelberg, Berlin Heidelberg pp. 80-102, XP019141406.
European Search Report dated Oct. 9, 2024, issued in European Application No. 23740449.6.
Indian Office Action dated Feb. 19, 2025, issued in Indian Application No. 202241001343.

* cited by examiner

```
▽ ⌺ DecorView
  ▽ ▥ LinearLayout
    ▦ action_mode_bar_stub – ViewStub
    ▽ ▣ FrameLayout
      ▽ ⌺ action_bar_root – FitWindowsFrameLayout
        ▽ ⌺ content – ContentFrameLayout
          ▽ ▥ LinearLayout
            ▽ ⌺ toolbar – BidiToolbar
              ▽ ⌺ conversation_layout – KeyboardPopupLayout
                ▫ attach_anchor – View
                ⌺ conversation_background – WallPaperView
                ▫ transition_clipper_top – View
                ▽ ⌺ list – ConversationListView
                  ▽ ⌺ 2Yk
                  ▽ ⌺ 2Zq
                  ▽ ⌺ 2Zq
                  ▽ ⌺ 2Zq
                  ▽ ⌺ 2Zq
                    ▽ ▥ main_layout – LinearLayout
                      ▽ ▥ name_in_group – LinearLayout
                        ⌺ name_in_group_tv – TextEmojiLabel
                        ⌺ pushname_in_group_tv – TextEmojiLabel
                      ▣ quoted_message_holder – FrameLayout
                      ▣ suspicious_link_indicator_holder – FrameLayout
                      ▣ web_page_preview_holder – FrameLayout
                      ▽ ⌺ conversation_text_row – TextAndDateLayout
                        ⌺ message_text – "Good... Its been long since we met"
                        ▽ ▥ date_wrapper – LinearLayout
                          ⌺ date – "16:49"
                      ⌺ forward – WalmageView
```

METHOD AND ELECTRONIC DEVICE FOR INTELLIGENTLY READING DISPLAYED CONTENTS

CROSS-REFERENCE TO RELATED APPLICATION(S)

This application is a continuation application, claiming priority under § 365(c), of an International application No. PCT/KR2023/000511, filed on Jan. 11, 2023, which is based on and claims the benefit of an Indian Provisional patent application number 202241001343, filed on Jan. 11, 2022, in the Indian Intellectual Property Office, and of an Indian patent application number 202241001343, filed on Jun. 1, 2022, in the Indian Intellectual Property Office, the disclosure of each of which is incorporated by reference herein in its entirety.

FIELD OF INVENTION

The disclosure relates to an electronic device. More particularly, the disclosure relates to a method and the electronic device for intelligently reading displayed contents.

BACKGROUND

Visually impaired users of electronic devices, such as a smartphone, laptop, etc. use a screen reading option to understand displayed content including a text, an emoji, etc. Even for normal users using robotic assistants, Internet of things (IoT) devices, voice assistant devices like Bixby, Echo, etc. needed to read aloud the displayed content using the screen reading option. The screen reading option works using an existing text-to-speech (TTS) method. The screen reading option allows the devices to read aloud the text in the displayed content or a definition/text associated with the emoji.

FIGS. 1 and 2 illustrate a screen reading of the displayed contents by an electronic device according to the related art. Consider, the electronic device receives a birthday wishing message incudes the text and a set of emojis.

Referring to 11 of the FIG. 1, the electronic device displays the content including the birthday wishing message and a time of reception of the message. Then the electronic device reads the displayed content as "Happy Birthday cake party face party popper balloon wrap present confetti seventeen o four in list nineteen items". The user wishes to know a meaning of the birthday wishing message. Instead of meaningfully reading the displayed content (11), the electronic device simply reads the text, definition of the emoji, and time without giving any pause or providing emotional meaning intended for the set of emojis. Hence, the users will get confused and an actual intent of the displayed content is lost in detailing out of each and every displayed content.

Referring to FIG. 2, consider the electronic device displays 3 chat messages (12-14) including 3 text messages and a time of reception of the message under each message. The electronic device reads the first chat message (12) as "Wow Super Pic What's the occasion Twenty three o one two double taps and holds to select messages". The electronic device reads the second chat message (13) as "Anita you are looking very gorgeous and Yajat is looking super handsome ok hand light skin tone ok hand light skin tone twenty three o two double tap and hold to select messages". The electronic device reads the second chat message (14) as "Where is Sumit take a selfie and send that also twenty three o two double tap and hold to select messages". The user wishes to know the meaning of the chat message. Instead of meaningfully reading the displayed content (12-14), the electronic device reads the displayed content as-is, without understanding meaning, intent, context, emotion, and sensitivity. Hence, the users will get confused and won't understand the actual meaning of the displayed content. Because the electronic device lacks intelligence in meaningfully reading the displayed content, the electronic device reads the whole of the displayed content without knowing relevant/irrelevant content. In addition, the electronic device does not associate intent/context/emotion with the displayed content, and hence the message being read appears more of mechanical than human. Thus, it is desired to provide a solution for intelligently reading the displayed contents of the electronic device.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide a method and an electronic device for intelligently reading displayed content. The electronic device reads the displayed content on a screen meaningfully by understanding the displayed content and providing generative text reading and generative sound expression based on a controlled content generation network with style imitation, which is significantly beneficial to visually impaired users and brings an intuitive user experience for general users too.

Additional aspects will be set forth in part in the description which follows and, in part, will be apparent from the description, or may be learned by practice of the presented embodiments.

SUMMARY

In accordance with an aspect of the disclosure, a method for intelligently reading displayed contents by an electronic device is provided. The method includes analyzing, by the electronic device, a plurality of contents displayed on a screen of the electronic device. The method includes extracting, by the electronic device, a plurality of insights including intent, importance, emotion, sound representation, and information sequence of the plurality of contents from the plurality of contents based on the analysis. The method includes generating, by the electronic device, audio emulating the extracted plurality of insights.

In an embodiment of the disclosure, where extracting, by the electronic device, the plurality of insights including the intent, the importance, the emotion, the sound representation, and the information sequence from the plurality of contents based on the analysis, includes generating, by the electronic device, a screen representation based on the analysis, and determining, by the electronic device, the plurality of insights including the intent, the importance, the emotion, the sound representation and the information sequence using the screen representation.

In an embodiment of the disclosure, where generating, by the electronic device, the screen representation based on the analysis, includes generating, by the electronic device, content embeddings by encoding each content of the plurality of contents, analyzing, by the electronic device, views on the screen, identifying, by the electronic device, importance of each of the views and a relationship between the views based on the analysis, generating, by the electronic device, contextual content groups by grouping the views based on the importance of each of the views and the relationship between the views, and determining, by the electronic device, the screen representation using the content embeddings and the contextual content groups.

In an embodiment of the disclosure, where generating, by the electronic device, the contextual content groups by grouping the views based on the importance of each of the views and the relationship between the views, includes selecting, by the electronic device, a current view of the views, identifying, by the electronic device, previous child views and next child views of the current view, parsing, by the electronic device, the current view, the previous child views and the next child views to fetch the plurality of contents in the current view, the previous child views and the next child views, determining, by the electronic device, whether the current view, and/or the previous child views and/or the next child views have a context dependent field, determining, by the electronic device, a relevant context from the context dependent field, classifying, by the electronic device, the current view, the previous child views and the next child views to an important class or an unimportant class based on the relevant context, and grouping, by the electronic device, content of the views into the important class.

In an embodiment of the disclosure, where determining, by the electronic device, the sound representation using the screen representation, includes analyzing, by the electronic device, multimodal features including a text and an emoji(s) present in the screen representation, generating, by the electronic device, multimodal embeddings of the multimodal features in the screen representation using a deep neural networks (DNN), and classifying, by the electronic device, the multimodal embeddings into a sound label belongs to the sound representation using the DNN.

In an embodiment of the disclosure, where generating, by the electronic device, the multimodal embeddings from the multimodal features in the screen representation using the DNN, includes creating, by the electronic device, a word embedding and a character embedding based on the text in the multimodal features, creating, by the electronic device, a textual embedding based on the word embedding and the character embedding, determining, by the electronic device, a textual definition of the emoji(s) in the multimodal features, creating, by the electronic device, an emoji embedding based on the textual definition of the emoji(s), and generating, by the electronic device, the multimodal embeddings based on the emoji embedding and the textual embedding.

In an embodiment of the disclosure, where classifying, by the electronic device, the multimodal embeddings into one of the sound labels belong to the sound representation using the DNN, includes determining, by the electronic device, a similarity score of energy functions by passing the multimodal embeddings through a twin convolutional neural network with shared weights, where the twin convolutional neural network learns the shared weights and the similarity score by minimizing a triplet loss function, and classifying, by the electronic device, the multimodal embeddings into one of the sound labels belongs to the sound representation based on the similarity score of the energy functions.

In an embodiment of the disclosure, where determining, by the electronic device, the intent, the importance, and the emotion using the screen representation includes creating, by the electronic device, the character embedding, the word embedding, and the emoji embedding from the screen representation, determining, by the electronic device, a stacked gated recurrent unit (GRU) by concatenating the character embedding, the word embedding, and the emoji embedding, determining, by the electronic device, intent attention, importance attention, and emotion attention and corresponding loss function of each attention based on the stacked GRU, and determining, by the electronic device, the intent, the importance, and the emotion based on the intent attention, the importance attention, and the emotion attention and corresponding loss function of each attention.

In an embodiment of the disclosure, where determining, by the electronic device, the information sequence using the screen representation, includes determining, by the electronic device, a textual definition of the multimodal features including a video, an image, and an emoji present on the screen representation, creating, by the electronic device, the word embedding and the character embedding based on the textual definition of the multimodal features, determining, by the electronic device, character representations based on the character embedding, determining, by the electronic device, word representations based on the character representations and the word embedding, and determining, by the electronic device, the information sequence based on the word representations.

In an embodiment of the disclosure, where generating, by the electronic device, the audio emulating the extracted plurality of insights, includes determining, by the electronic device, blueprints of the plurality of contents, determining, by the electronic device, the generative content by a controlled generation of contents with style imitation from the plurality of contents based on the extracted plurality of insights and the blueprints, and providing, by the electronic device, the generative content to a screen reader for generating the audio emulating the generative content.

In an embodiment of the disclosure, where determining, by the electronic device, the generative content by controlled generation of contents with style imitation from the plurality of contents based on the extracted plurality of insights and the blueprints, includes determining, by the electronic device, contextual phrases from the plurality of contents based on the intent, context, emotion, sensitivity, and sentence understanding of the plurality of contents, determining, by the electronic device, sound expressions for the emoji(s) of the plurality of contents based on sound labels, determining, by the electronic device, a summary of the plurality of contents, determining, by the electronic device, personalized sounds based on a gender, multilingual feature, and demographics feature of a user of the electronic device, and generating, by the electronic device, generative content based on the extracted plurality of insights, the blueprints, the personalized sounds, the summary of the plurality of contents, the sound expressions, and the contextual phrases.

In accordance with another aspect of the disclosure, an electronic device for intelligently reading the displayed contents is provided. The electronic device includes an intelligent screen reading engine, a memory, at least one processor, and the screen, where the intelligent screen reading engine is coupled to the memory and the processor. The intelligent screen reading engine is configured for analyzing the plurality of contents displayed on the screen. The intelligent screen reading engine is configured for extracting the plurality of insights including the intent, the importance, the emotion, the sound representation, and the information sequence of the plurality of contents from the plurality of contents based on the analysis. The intelligent screen reading engine is configured for generating the audio emulating the extracted plurality of insights.

In an embodiment of the disclosure, a method for intelligently reading displayed contents by an electronic device is provided. The method includes obtaining a screen representation based on a plurality of contents displayed on a screen of the electronic device. The method includes extracting a plurality of insights comprising at least one of intent, importance, emotion, sound representation and information sequence of the plurality of contents from the plurality of contents based on the screen representation. The method includes generating audio emulating the extracted plurality of insights.

In an embodiment of the disclosure, an electronic device for intelligently reading displayed contents is provided. The electronic device includes a screen. The electronic device includes a memory storing one or more instruction. The electronic device includes at least one processor 130 configured to execute the one or more instructions stored in the memory to: obtain a screen representation based on a plurality of contents displayed on a screen of the electronic device, extract a plurality of insights comprising at least one of intent, importance, emotion, sound representation and information sequence of the plurality of contents from the plurality of contents based on the screen representation, and generate audio emulating the extracted plurality of insights.

In an embodiment of the disclosure, a computer readable medium is provided. The computer readable medium containing instructions that when executed cause at least one processor to: obtain a screen representation based on a plurality of contents displayed on a screen of the electronic device, extract a plurality of insights comprising at least one of intent, importance, emotion, sound representation and information sequence of the plurality of contents from the plurality of contents based on the screen representation, and generate audio emulating the extracted plurality of insights.

Other aspects, advantages, and salient features of the disclosure will become apparent to those skilled in the art from the following detailed descriptions, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which:

FIGS. 7B and 7C illustrate a view hierarchy, a view, and the contextual content groups according to an embodiment of the disclosure;

Throughout the drawings, it should be noted that like reference numbers are used to depict the same or similar elements, features, and structures.

DETAILED DESCRIPTION OF INVENTION

Figure 1:
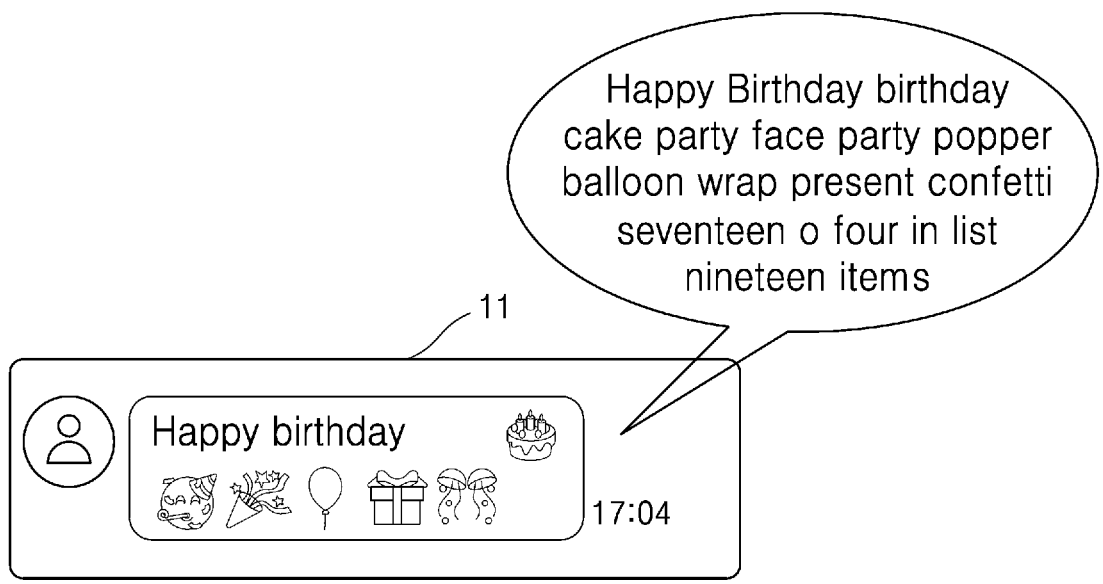
FIGS. 1 and 2 illustrate a screen reading of displayed contents by devices according to the related art.
Figure 2:
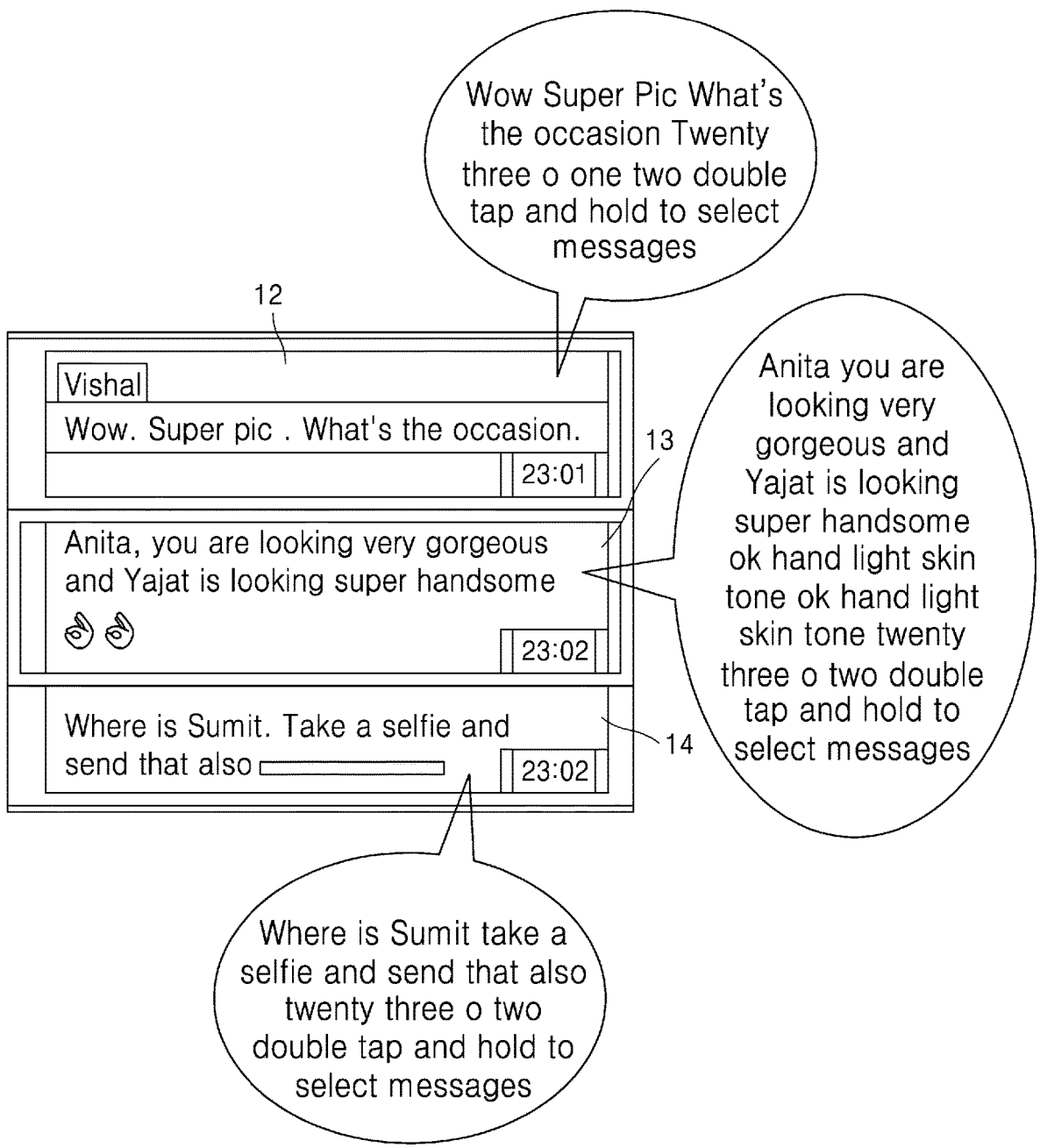

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for intelligently reading displayed contents by an electronic device. The method includes analyzing, by the electronic device, a plurality of contents displayed on a screen of the electronic device. The method includes extracting, by the electronic device, a plurality of insights including intent, importance, emotion, sound representation, and information sequence of the plurality of contents from the plurality of contents based on the analysis. The method includes generating, by the electronic device, audio emulating the extracted plurality of insights.

Accordingly, the embodiments herein provide the electronic device for intelligently reading the displayed contents. The electronic device includes an intelligent screen reading engine, a memory, a processor, and the screen, where the intelligent screen reading engine is coupled to the memory and the processor. The intelligent screen reading engine is configured for analyzing the plurality of contents displayed on the screen. The intelligent screen reading engine is configured for extracting the plurality of insights including the intent, the importance, the emotion, the sound representation and the information sequence of the plurality of contents from the plurality of contents based on the analysis. The intelligent screen reading engine is configured for generating the audio emulating the extracted plurality of insights.

Unlike existing methods and systems, the electronic device reads the displayed content in the screen meaningfully by understanding the displayed content using a screen graph, deriving content insights with a DNN, and providing generative text reading and generative sound expression based on a controlled content generation network with style imitation, which is significantly beneficial to visually impaired users and bring an intuitive user experience for general users too.

Referring now to the drawings, and more particularly to FIGS. 3 to 6, 7A, 7B, 7C, 8 to 18, 19A to 19E, 20A, 20B, and 21 to 30, there are shown preferred embodiments.

Figure 3:
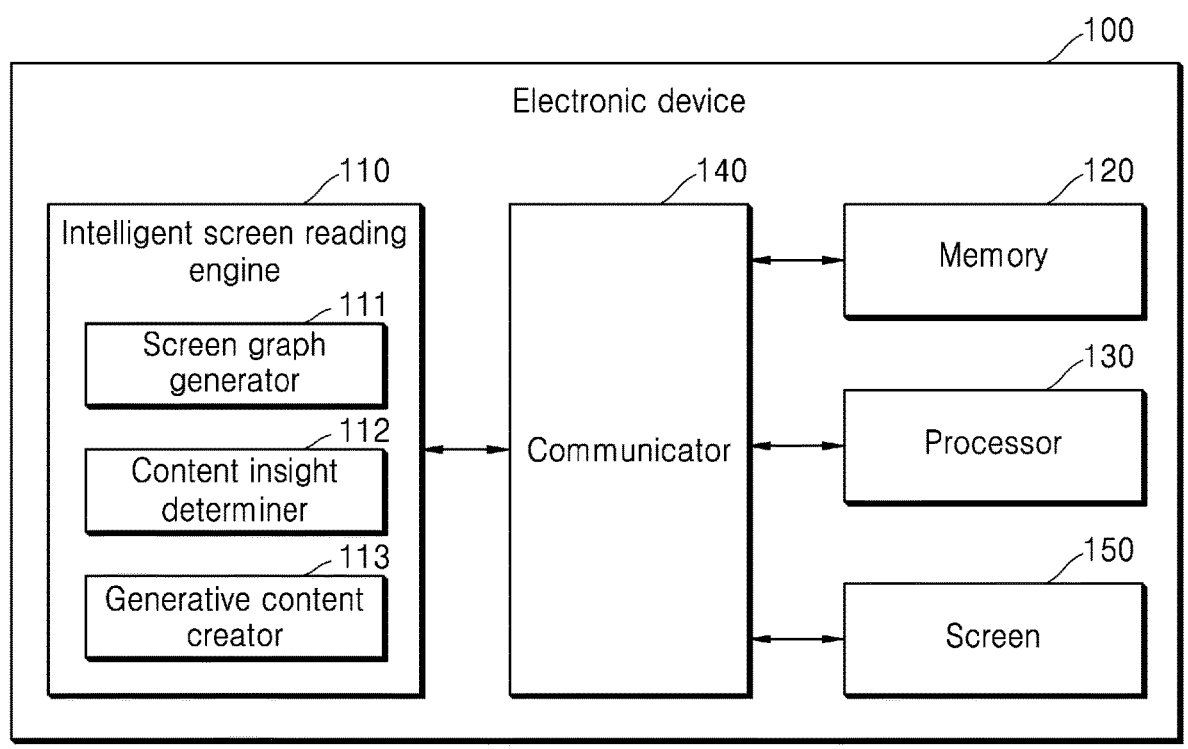
FIG. 3 is a block diagram of an electronic device for intelligently reading displayed contents according to an embodiment of the disclosure.

FIG. 3 is a block diagram of an electronic device for intelligently reading displayed contents according to an embodiment of the disclosure.

Referring to FIG. 3, examples of the electronic device (100) include, but are not limited to a smartphone, a tablet computer, a personal digital assistance (PDA), a desktop computer, an Internet of things (IoT), a robotic assistant, a voice assistant device, etc. In an embodiment of the disclosure, the electronic device (100) includes an intelligent screen reading engine (110), a memory (120), a processor (130), a communicator (140), and a screen (150).

The memory (120) includes a database to store a sound note associated with an emoji. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in a random access memory (RAM) or cache). The memory (120) can be an internal storage unit or it can be an external storage unit of the electronic device (100), a cloud storage, or any other type of external storage.

The processor (130) is configured to execute instructions stored in the memory (120). The processor (130) may be a general-purpose processor, such as a central processing unit (CPU), an application processor (AP), or the like, a graphics-only processing unit, such as a graphics processing Unit (GPU), a visual processing unit (VPU) and the like. The processor (130) may include multiple cores to execute the instructions.

The communicator (140) is configured for communicating internally between hardware components in the electronic device (100). Further, the communicator (140) is configured to facilitate the communication between the electronic device (100) and other devices via one or more networks (e.g., radio technology). The communicator (140) includes an electronic circuit specific to a standard that enables wired or wireless communication.

The screen (150) is a physical hardware component that can be used to display the content and can receive inputs from a user. Examples of the screen (150) include, but are not limited to a light emitting diode display, a liquid crystal display, or the like.

The intelligent screen reading engine (110) is implemented by processing circuitry, such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports, such as printed circuit boards and the like.

Unlike the intelligent screen reading engine (110) shown in FIG. 3 as a separate configuration from the processor (130) and memory (120), the present disclosure is not limited thereto. In an embodiment of the disclosure, at least part of the function of the intelligent screen reading engine (110) is implemented by the memory (120) and the processor (130). The memory (120) stores instructions, corresponding to the function of the intelligent screen reading engine (110), to be executed by the processor (130).

In an embodiment of the disclosure, the intelligent screen reading engine (110) includes a screen graph generator (111), a content insight determiner (112), and a generative content creator (113). The screen graph generator (111), the content insight determiner (112), and the generative content creator (113) are implemented by processing circuitry, such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports, such as printed circuit boards and the like.

The intelligent screen reading engine (110) analyzes a plurality of contents displayed on the screen (150). The intelligent screen reading engine (110) may obtain a screen representation based on the plurality of contents displayed on the screen (150). In this disclosure, the term "representation" may indicate extracted or encoded data (e.g., feature map) representing the feature of particular data. The content includes a text, an emoji, an image, and a video. Further, the intelligent screen reading engine (110) extracts a plurality of insights including intent, importance, emotion, sound representation (e.g., a notification sound) and information sequence of the plurality of contents from the plurality of contents based on the screen representation or the analysis. The sound representation varies based on gender, emotion, language, nature of the content and context of the content. Further, the intelligent screen reading engine (110) generates audio emulating the extracted plurality of insights and enhanced text providing meaningful information.

In an embodiment of the disclosure, for obtaining the screen representation, the intelligent screen reading engine (110) may obtain a plurality of screen embeddings based on the plurality of contents displayed on the screen. The intelligent screen reading engine (110) may obtain a plurality of contextual content groups based on the plurality of contents displayed on the screen. The intelligent screen reading engine (110) may obtain the screen representation based on the plurality of screen embeddings and the plurality of contextual content groups.

In an embodiment of the disclosure, for extracting the plurality of insights including the intent, the importance, the emotion, the sound representation, and the information sequence from the plurality of contents based on the analysis, includes the intelligent screen reading engine (110) generates a screen representation based on the analysis. The screen representation precisely represents an overall screen view by grouping, using a view hierarchy and view positions. Further, the intelligent screen reading engine (110) determines the plurality of insights including the intent, the importance, the emotion, the sound representation, and the information sequence using the screen representation.

In an embodiment of the disclosure, for generating the screen representation based on the analysis, the intelligent screen reading engine (110) generates content embeddings by encoding each content of the plurality of contents. Further, the intelligent screen reading engine (110) analyzes views on the screen (150). The content displayed on the screen (150) is divided into views. Consider in a chat thread, a top component of the content contains profile info, followed by components, such as chat messages by sender and receiver, etc. where each component is the view. Layout information in the view hierarchy of the screen (150) helps in localizing icon elements. Then apply a pixel-based object classification to identify icon types on the screen (150). Further, the intelligent screen reading engine (110) identifies importance of each of the views and a relationship between the views based on the analysis. Further, the intelligent screen reading engine (110) generates contextual content groups by grouping the views based on the importance of each of the views and the relationship between the views. Further, the intelligent screen reading engine (110) determines the screen representation using the content embeddings and the contextual content groups.

In an embodiment of the disclosure, for generating the contextual content groups by grouping the views based on the importance of each of the views and the relationship between the views, the intelligent screen reading engine (110) obtains (or receives) a current view of the views. The current view may be selected by the user, and the intelligent screen reading engine (110) may get the input from the user (i.e., user input). Further, the intelligent screen reading engine (110) identifies previous child views and next child views of the current view. Further, the intelligent screen reading engine (110) parses the current view, the previous child views, and the next child views to fetch the plurality of contents in the current view, the previous child views and the next child views. Further, the intelligent screen reading engine (110) determines whether the current view, and/or the previous child views and/or the next child views have a context dependent field (e.g., a time, a read/unread status, a relation in case of contacts). Further, the intelligent screen reading engine (110) determines a relevant context from the context dependent field. Further, the intelligent screen reading engine (110) classifies the current view, the previous child views and the next child views to an important class or an unimportant class based on the relevant context. Further, the intelligent screen reading engine (110) groups content of the views into the important class.

In an embodiment of the disclosure, a deep neural network trained to generate importance score of the views based on the relevant context of the views. The intelligent screen reading engine (110) may classify the views to an important class or an unimportance class using the importance score. For example, the importance score of one view is greater than predetermined importance threshold, the view may be classified as an important class. The importance score of other view is smaller than or equal to predetermined importance threshold, the view may be classified as an important class.

In an embodiment of the disclosure, for determining the sound representation using the screen representation, the intelligent screen reading engine (110) analyzes multimodal features including a text and an emoji(s) present in the screen representation. The intelligent screen reading engine (110) obtains multimodal features comprising a text and an emoji(s) based on the screen representation. Further, the intelligent screen reading engine (110) generates multimodal embeddings based on the multimodal features and classifying the multimodal embeddings into a sound label belonging to the sound representation using a DNN. A Siamese neural network, such as a multimodal input classification using Siamese network architecture (MICSA) is an example of the DNN.

In an embodiment of the disclosure, for generating the multimodal embeddings from the multimodal features in the screen representation using the DNN, the intelligent screen reading engine (110) generates (or creates) a word embedding and a character embedding based on the text in the multimodal features. Further, the intelligent screen reading engine (110) generates (or creates) a textual embedding based on the word embedding and the character embedding. Further, the intelligent screen reading engine (110) determines a textual definition of the emoji(s) in the multimodal features. Further, the intelligent screen reading engine (110) generates (or creates) an emoji embedding based on the textual definition of the emoji(s). Further, the intelligent screen reading engine (110) generates the multimodal embeddings based on the emoji embedding and the textual embedding. The textual definition of the emoji(s) (or emoji definition) may indicate textual descriptions which explain the context of use of the emoji. The textual definition of the emoji may be generated by using a deep neural network trained to generate description of the emoji based on the emoji.

In an embodiment of the disclosure, for classifying the multimodal embeddings into one of the sound labels belongs to the sound representation using the DNN, the intelligent screen reading engine (110) determines a similarity score of energy functions by passing the multimodal embeddings through a twin convolutional neural network with shared weights. The similarity score is a measure of similarities of two data objects (e.g., sound data). The twin convolutional neural network learns the shared weights and the similarity score by minimizing a triplet loss function. Further, the intelligent screen reading engine (110) classifies the multimodal embeddings into one of the sound labels belongs to the sound representation based on the similarity score of the energy functions.

In an embodiment of the disclosure, for determining the intent, the importance, and the emotion using the screen representation, the intelligent screen reading engine (110) generates (or creates) the character embedding, the word embedding, and the emoji embedding from the screen representation. Further, the intelligent screen reading engine (110) concatenates the character embedding, the word embedding, and the emoji embedding. Further, the intelligent screen reading engine (110) determines intent attention, importance attention, and emotion attention and corresponding loss function of each attention based on the result of the concatenation using a stacked gated recurrent unit (GRU). The intent attention, the importance attention, and the emotion attention is determined by applying an attention mechanism on the intent, the importance and the emotion. Further, the intelligent screen reading engine (110) determines the intent, the importance, and the emotion based on the intent attention, the importance attention, and the emotion attention and corresponding loss function of each attention.

In an embodiment of the disclosure, for determining the information sequence using the screen representation, the intelligent screen reading engine (110) determines a textual definition of the multimodal features including a video, an image, and an emoji present in the screen representation. Further, the intelligent screen reading engine (110) generates (or creates) the word embedding and the character embedding based on the textual definition of the multimodal features. Word embedding is generated (or created) by extracting word tokens and passing the word tokens through an embedding layer. The character embedding is generated (or created) by dividing each word into characters and determines the character embedding using one or more combinations of each character. For example, the word "Hello" is divided as "H", "E", "L", "L", "O".

Further, the intelligent screen reading engine (110) determines character representations based on the character embedding. Further, the intelligent screen reading engine (110) determines word representations based on the character representations and the word embedding. The word representation is a representation of words as a numeric vector in a semantic space which can be given as input to machine learning models for better understanding of the intent and the emotions. The character representation is a representation of characters as the numeric vectors in the semantic space which can be given as the input to the machine learning models for better understanding of the intent and the emotions. Further, the intelligent screen reading engine (110) determines the information sequence based on the word representations. Further, the intelligent screen reading engine (110) determines the information sequence based on the word representations.

Figure 13:
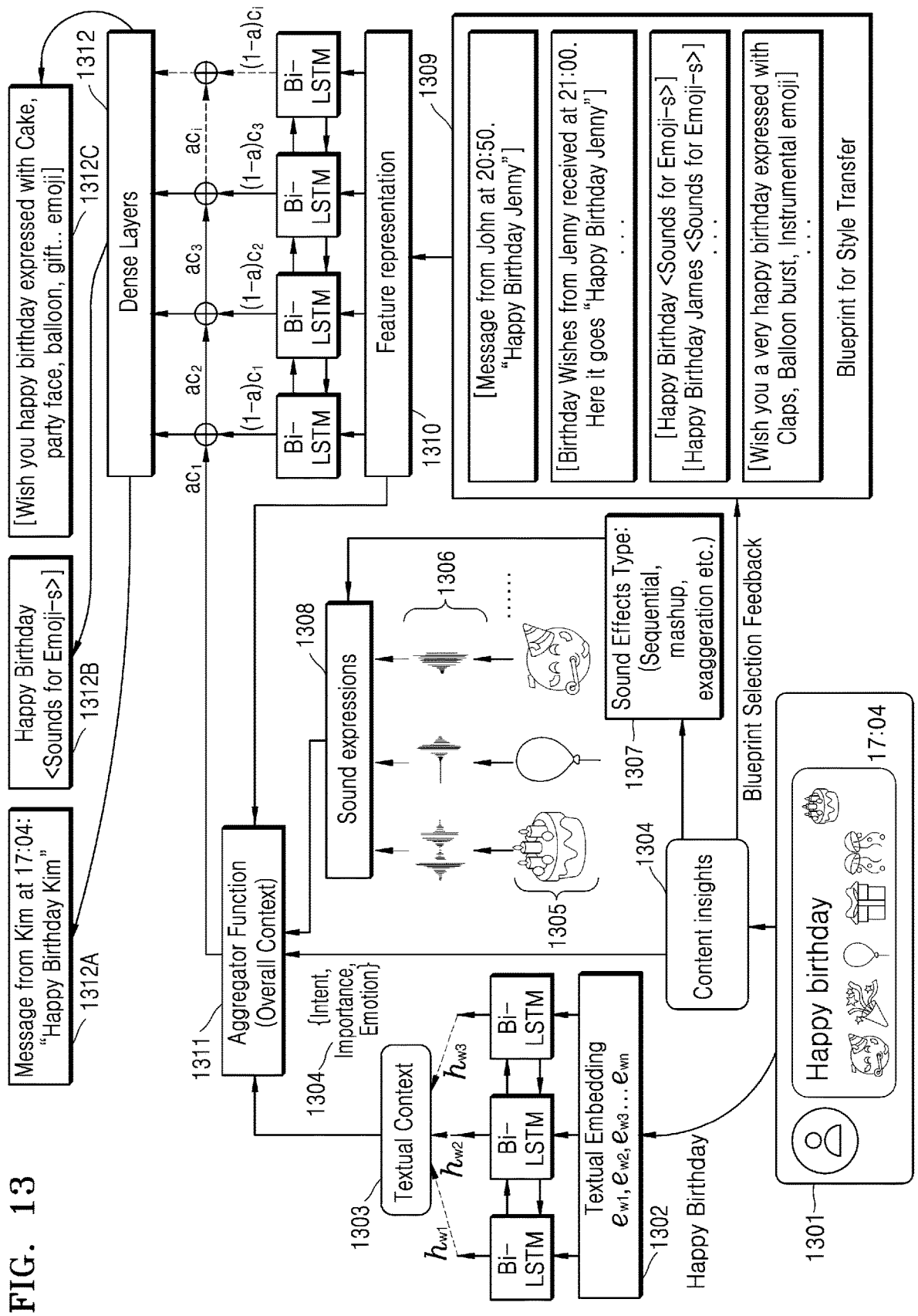
FIG. 13 is a flow diagram illustrating an embodiment of generating the generative content according to an embodiment of the disclosure.

In an embodiment of the disclosure, for generating the audio emulating the extracted plurality of insights, the intelligent screen reading engine (110) determines blueprints of the plurality of contents. The blueprints as seen in FIG. 13 are standard representation of a meaningful text in daily usage scenarios. The blueprints may be predetermined or be obtained by a user input. Further, the intelligent screen reading engine (110) determines the generative content by controlled generation of contents with style imitation from the plurality of contents based on the extracted plurality of insights and the blueprints. Further, the intelligent screen reading engine (110) provides the generative content to a screen reader for generating the audio emulating the generative content.

In an embodiment of the disclosure, for determining the generative content by controlled generation of contents with style imitation from the plurality of contents based on the extracted plurality of insights and the blueprints, the intelligent screen reading engine (110) determines the contextual phrases from the plurality of contents based on the intent, context, the emotion, sensitivity, and sentence understanding of the plurality of contents. The contextual phrases are sequences generated by incorporating relevant knowledge from input message like: intent of message, emotion from emojis, message sensitivity, message sender information, etc. Further, the intelligent screen reading engine (110) determines sound expressions for the emoji(s) of the plurality of contents based on sound labels. The sound expressions can be exaggeration of sound, mashup of sound, sequentially playing sound etc. Further, the intelligent screen reading engine (110) determines a summary of the plurality of contents. Further, the intelligent screen reading engine (110) determines personalized sounds based on a gender, multilingual feature, and demographic feature of the user. Further, the intelligent screen reading engine (110) generates a generative content based on the extracted plurality of insights, the blueprints, the personalized sounds, the summary of the plurality of contents, the sound expressions, and the contextual phrases.

The screen graph generator (111) understands the view and determines the view importance, the view relation, and the view context. The generative content creator (113) reads the generative content meaningfully by beautifying the displayed content, identifying symbols/emoji expressions in the displayed content, summarizing the displayed content to a text form, providing expressive TTS, removing sensitivity from the displayed content, and providing continuity. The content insight determiner (112) determines the emotion and the intent of the content. The generative content creator (113) controls generation of the generative content with style imitation by generating the text to read based on the intent, the context, the emotion, the sensitivity, and the sentence understanding. The generative content creator (113) includes the sound expressions into the generative content based on emoji combos like exaggeration, mashup, etc. The generative content creator (113) includes personalized sound into the generative content based on features like the multilingual and the demographics in notifications, and messages.

Although the FIG. 3 shows the hardware components of the electronic device (100) but it is to be understood that other embodiments are not limited thereon. In other embodiments of the disclosure, the electronic device (100) may include less or a greater number of components. Further, the labels or names of the components are used only for illustrative purpose and does not limit the scope of the disclosure. One or more components can be combined together to perform same or substantially similar function for intelligently reading the displayed contents.

Figure 4:
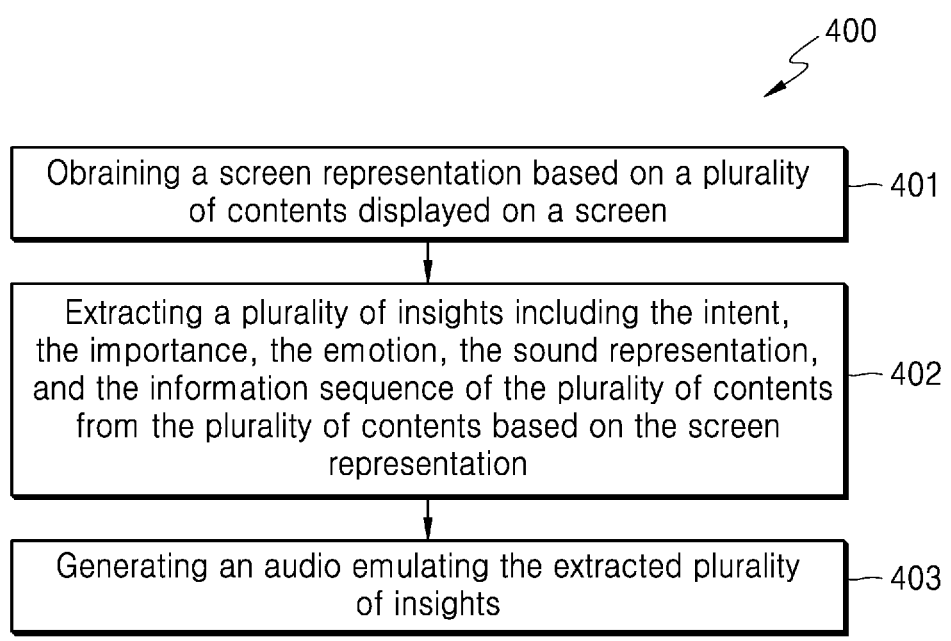
FIG. 4 is a flow diagram illustrating a method for intelligently reading displayed contents by the electronic device according to an embodiment of the disclosure.

FIG. 4 is a flow diagram illustrating a method for intelligently reading displayed contents by an electronic device according to an embodiment of the disclosure.

Referring to FIG. 4, in an embodiment of the disclosure, the method allows the intelligent screen reading engine (110) to perform operations 401-403 of the flow diagram (400). At operation 401, the method includes analyzing the plurality of contents displayed on the screen (150). At operation 402, the method includes extracting the plurality of insights including the intent, the importance, the emotion, the sound representation, and the information sequence of the plurality of contents from the plurality of contents based on the analysis. At operation 403, the method includes generating the audio emulating the extracted plurality of insights.

The various actions, acts, blocks, steps, or the like in the flow diagram (400) may be performed in the order presented, in a different order, or simultaneously. Further, in some embodiments of the disclosure, some of the actions, acts, blocks, steps, or the like may be omitted, added, modified, skipped, or the like without departing from the scope of the disclosure.

Figure 5:
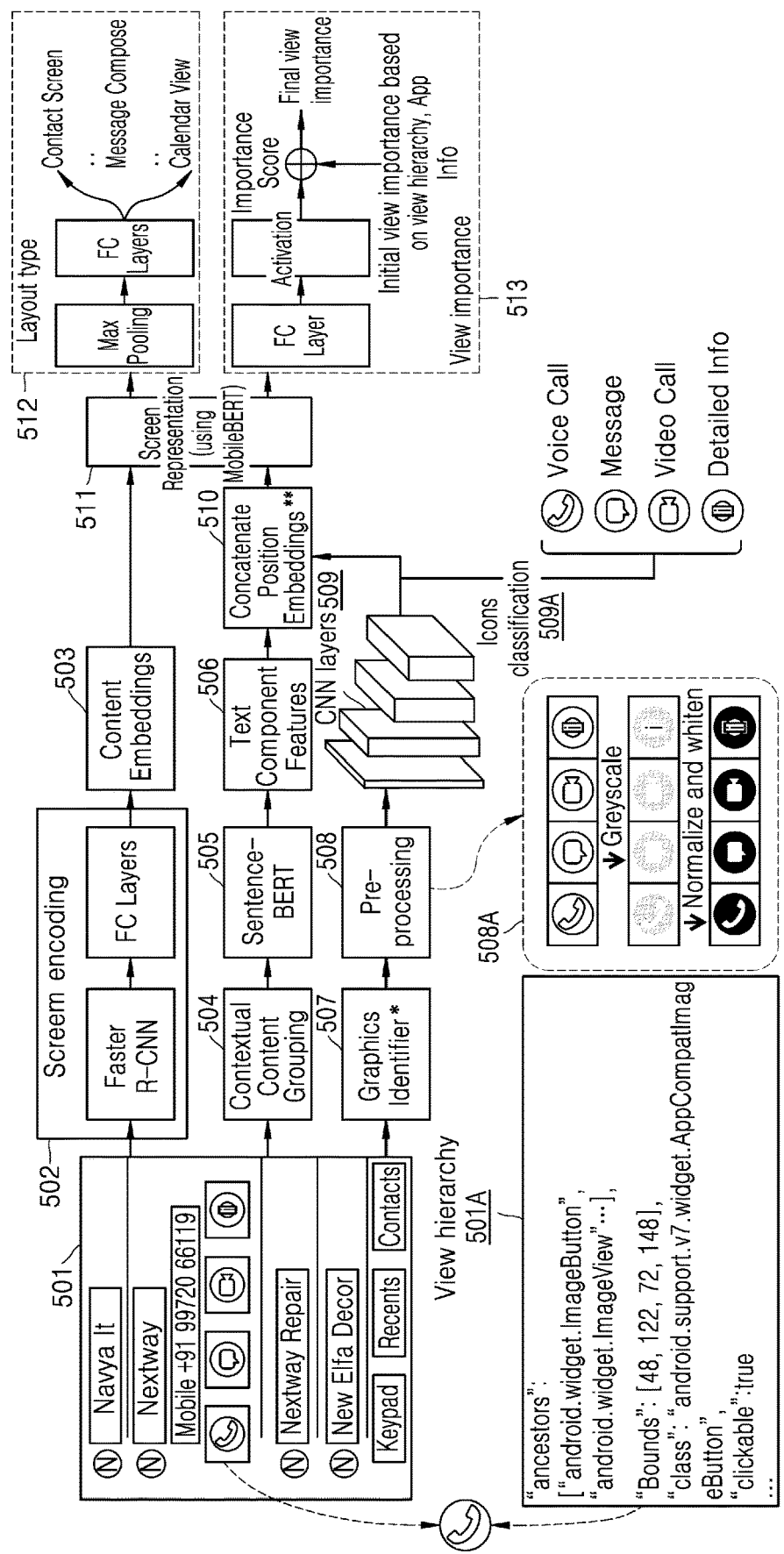
FIG. 5 is a flow diagram illustrating an embodiment of generating a screen representation according to an embodiment of the disclosure.

FIG. 5 is a flow diagram illustrating an embodiment of generating a screen representation according to an embodiment of the disclosure.

Referring to FIG. 5, at operation 501, consider the electronic device (100) is displaying a list of contacts in the contact application and an expanded view of a contact 'Nextway' includes icons of options under the contact 'Nextway' includes a voice call, a message, a video call, and other contact details. The screen graph generator (111) determines a view hierarchy as shown in 501A, and application information (App Info). At operations 502-503, the screen graph generator (111) generates the content embeddings by encoding each content of the plurality of contents displayed on the screen (150). Each content of the plurality of contents is encoded by passing the content through a faster region-based convolutional neural networks (R-CNN) followed by fully connected (FC) layers. At operation 504, the screen graph generator (111) identifies the views on the screen (150) and generates the contextual content groups by grouping.

At operation 505, the screen graph generator (111) generates sentence/text embeddings from the contextual content groups using a sentence bidirectional encoder representations from transformers (SBERT). At operation 506, the screen graph generator (111) extracts text component features from the sentence/text embeddings. At operation 507, the screen graph generator (111) determines a graphics identifier of each view. At operation 508, the screen graph generator (111) pre-processes the icons of options based on the graphics identifier of the icons. As shown in 508A, the icons in RGB color are converted to a greyscale format followed by normalization and whitening steps for pre-processing the icons. At operation 509, the screen graph generator (111) classifies the icons by passing the pre-processed icons through convolutional neural network (CNN) layers as shown in operation 509A. At operation 510, the screen graph generator (111) concatenates position embeddings using the text component features based on the classified icons. The position embeddings are obtained from the bounds $(x_1, y_1, x_2, y_2)$ in the view hierarchy. At operation

511, the screen graph generator (111) the screen representation by processing the content embeddings with the concatenated position embeddings using mobile bidirectional encoder representations from transformers (MobileBERT).

At operation 512, the screen graph generator (111) determines a layout type of the screen (150) based on the screen representation. The screen graph generator (111) performs max pooling of the screen representation followed by processing with FC layers for determining the layout type of the screen (150). At operation 513, the screen graph generator (111) determines the importance of each of the views based on the screen representation. The screen graph generator (111) processes the screen representation with the FC layers and activation functions for determining importance score of each view. Further, the screen graph generator (111) determines an initial view importance based on the view hierarchy information and the application information. Further, the screen graph generator (111) determines the importance of each of the views (i.e., final view importance) based on the initial view importance and the importance score.

Figure 6:
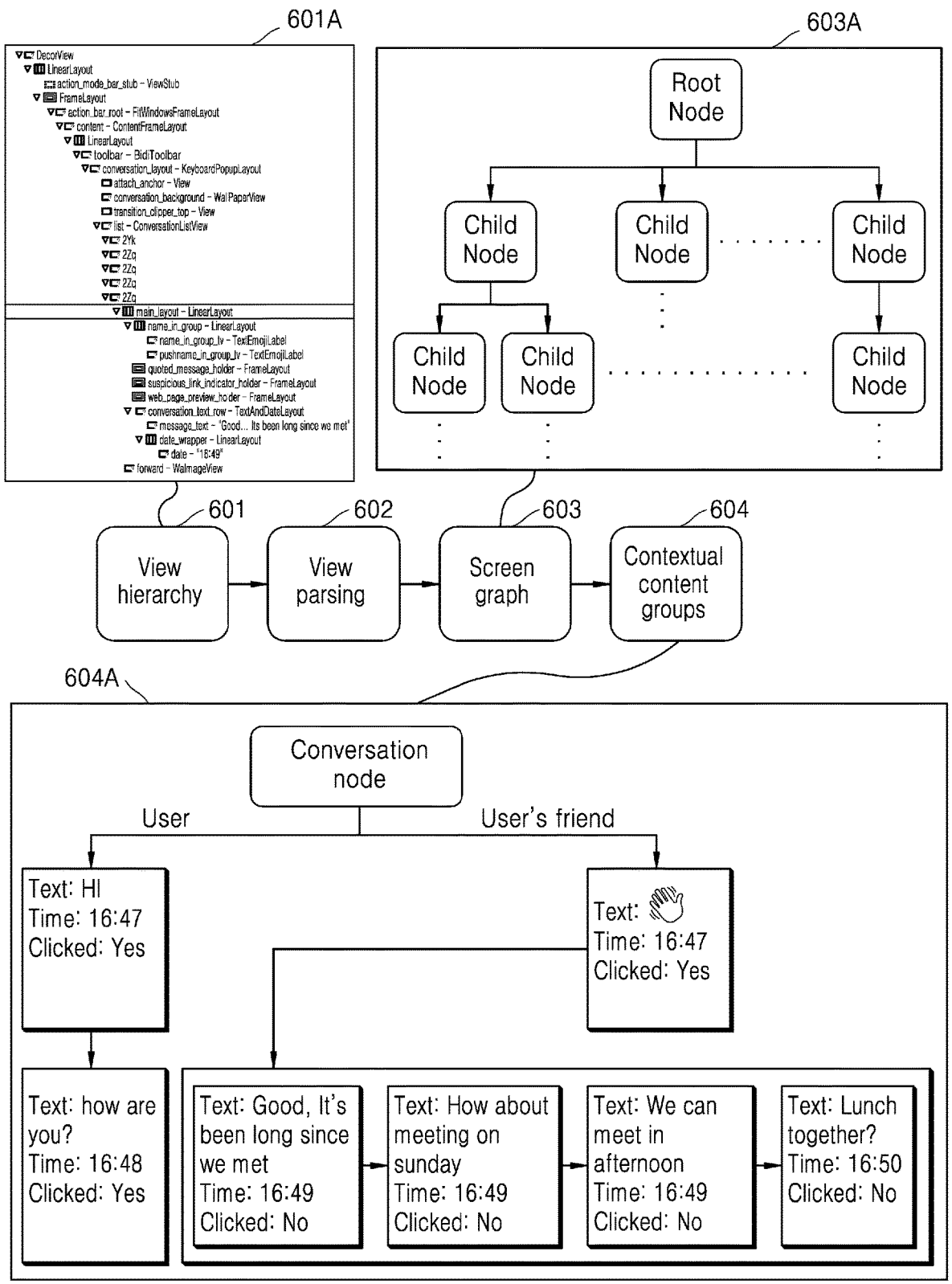
FIG. 6 is a flow diagram illustrating an embodiment of generating contextual content groups according to an embodiment of the disclosure.

FIG. 6 is a flow diagram illustrating an embodiment of generating a contextual content groups according to an embodiment of the disclosure.

Referring to FIG. 6, at operation 601, the screen graph generator (111) determines the view hierarchy (601A) (refer 708 in FIG. 7B). At operation 602, the screen graph generator (111) parses the view from the view hierarchy (601A). At operation 603, the screen graph generator (111) generates the screen graph (603A) by determining a root node, and child nodes under the root node from the parsed views. At operation 604, the screen graph generator (111) determines the contextual content groups by grouping all unread relevant messages together and updates the screen graph on the view selected by the user as shown in 604A.

Figure 7A:
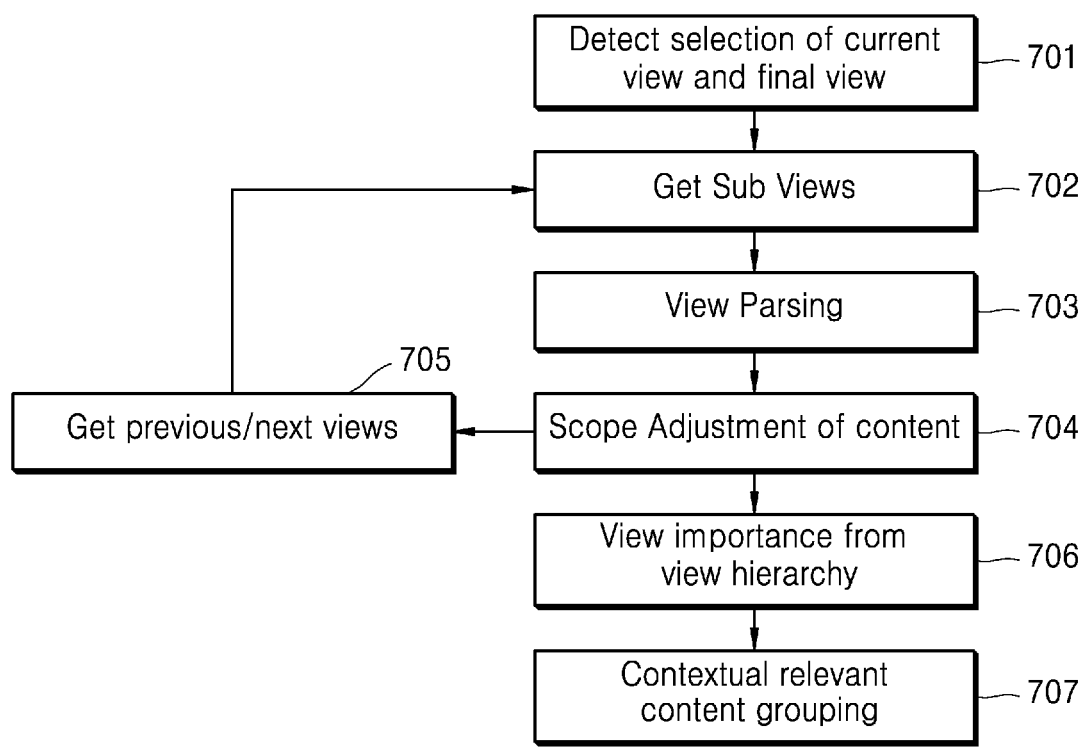
FIG. 7A is a flow diagram illustrating a method for generating the contextual content groups by the electronic device according to an embodiment of the disclosure.

FIG. 7A is a flow diagram illustrating a method for generating contextual content groups by an electronic device according to an embodiment of the disclosure.

Referring to FIG. 7A, at operation 701, the screen graph generator (111) detects a current view of the views selected by the user and a final view of the views. At operation 702, the screen graph generator (111) determines sub-views of the current view. At operation 703, the screen graph generator (111) parses the current view to fetch the plurality of contents in the current view. At operations 704-705, the screen graph generator (111) adjusts the scope of context (e.g., time) by determining the sub-views of the previous/next views and parsing the sub-views of the previous/next views. At operation 706, the screen graph generator (111) determines the importance of the view from the view hierarchy. At operation 707, the screen graph generator (111) groups the content of the views into the important class based on the importance.

Figure 7C:
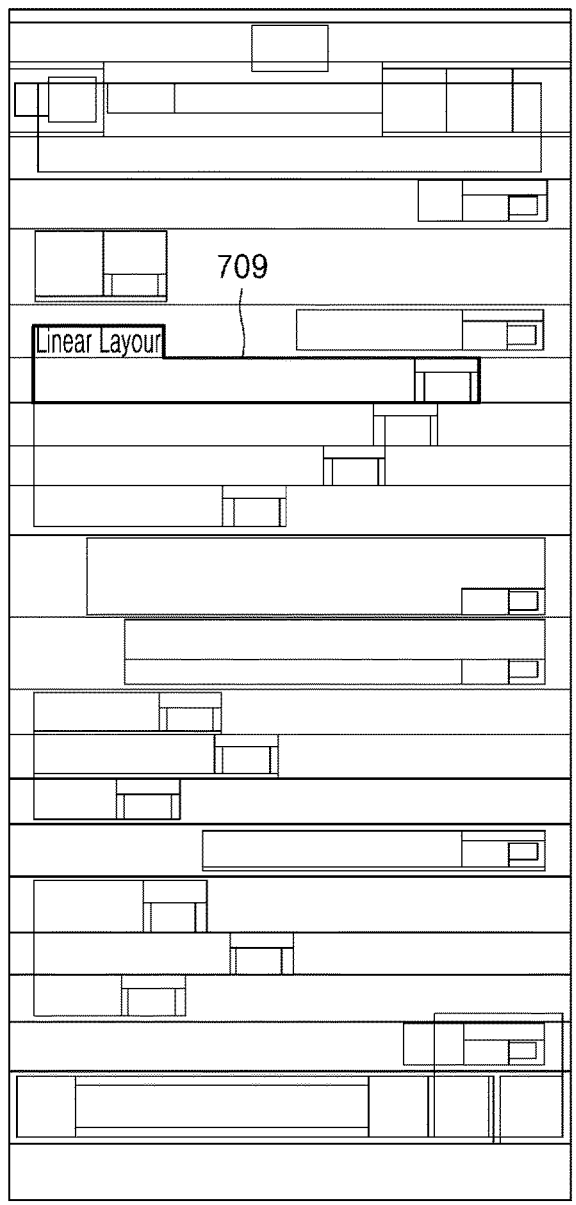
Figure 7C:
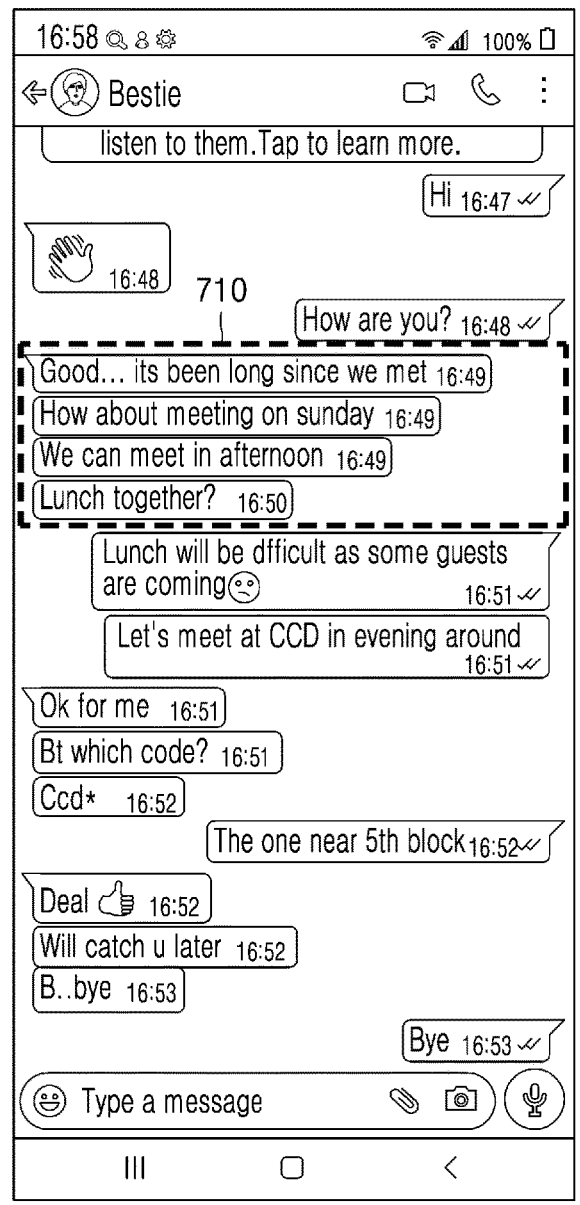

FIGS. 7B and 7C illustrates a view hierarchy, a view, and contextual content groups according to an embodiment of the disclosure.

Referring to FIGS. 7B and 7C, 708 represents the view hierarchy of a chat message, 709 represents the view of the chat message, and 710 represents the contextual content groups in the chat message.

Figure 8:
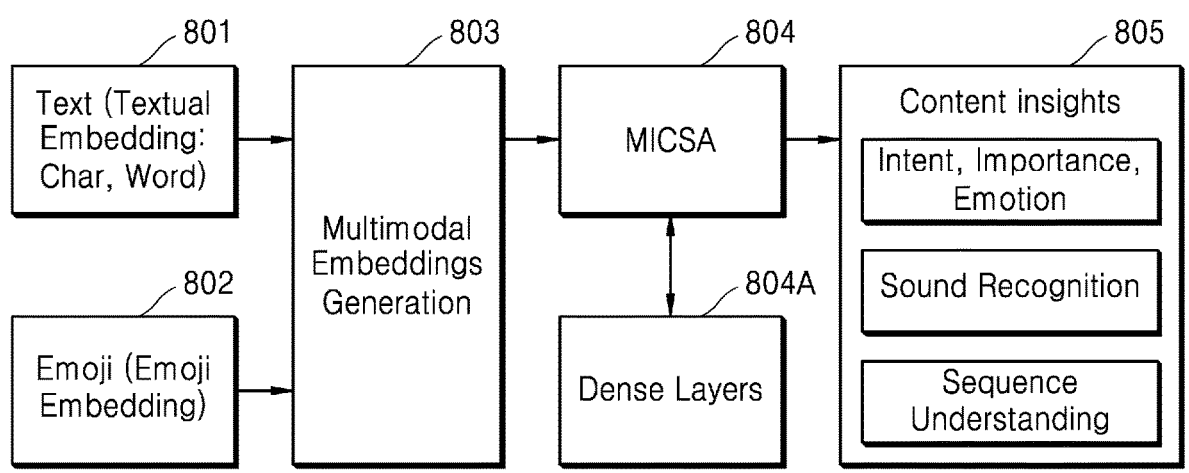
FIG. 8 is a flow diagram illustrating a method for determining the plurality of insights from a plurality of contents by the electronic device according to an embodiment of the disclosure.

FIG. 8 is a flow diagram illustrating a method for determining a plurality of insights from a plurality of contents by an electronic device according to an embodiment of the disclosure.

Referring to FIG. 8, at operations 801-802, the content insight determiner (112) identifies the texts and emojis in the plurality of contents displayed on the screen (150). Further, the content insight determiner (112) generates textual embedding including characters, and words from the texts. Further, the content insight determiner (112) generates emoji embedding from the emojis. At operation 803, the content insight determiner (112) creates multimodal embeddings using the textual embedding and the emoji embedding. At operations 804-805, the content insight determiner (112) determines the plurality of insights by processing the multimodal embeddings using the MICSA and dense layers (804A).

Figure 9:
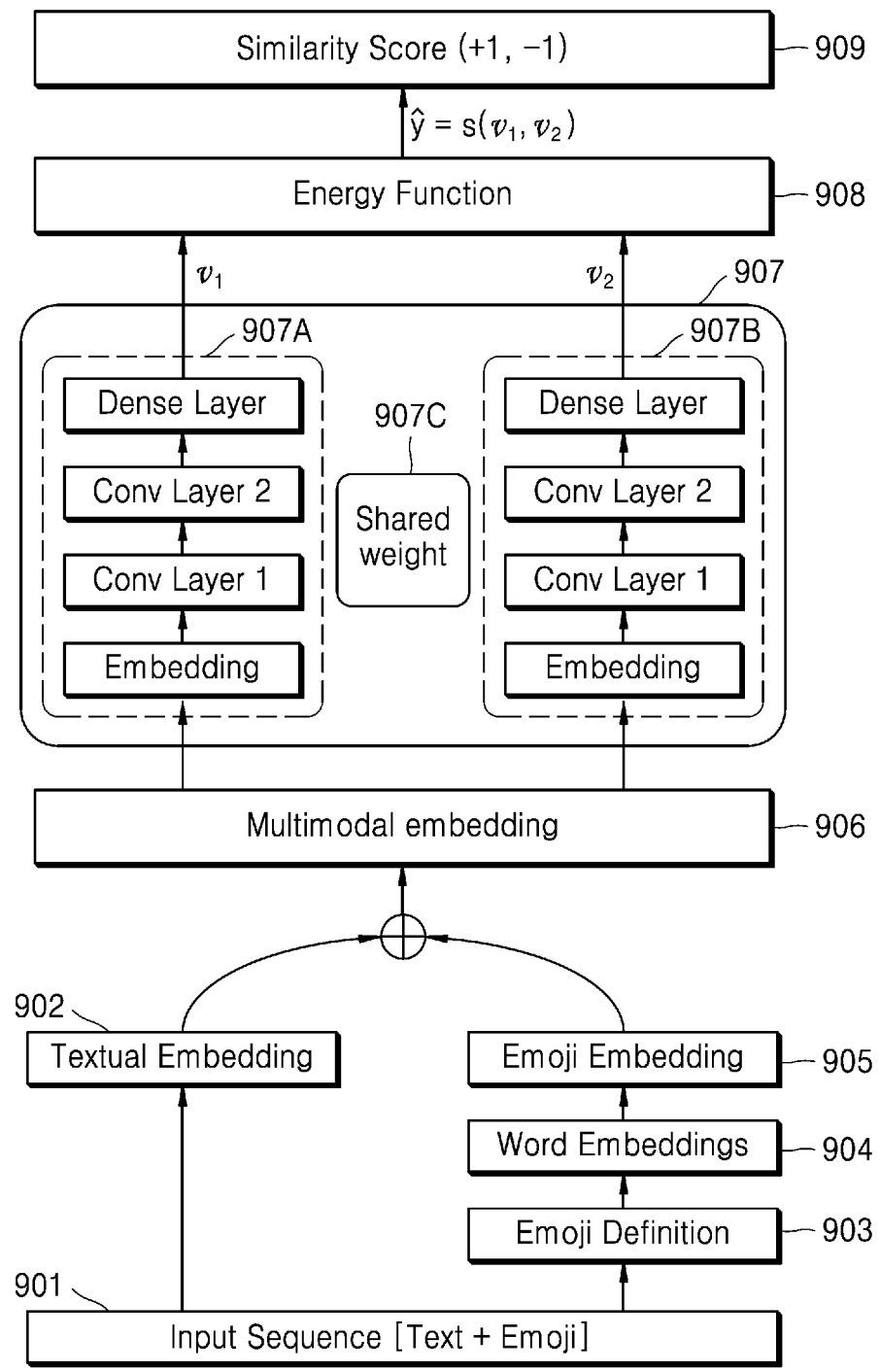
FIG. 9 is a flow diagram illustrating a method for determining sound representation of the plurality of contents using a Siamese neural network by the electronic device according to an embodiment of the disclosure.

FIG. 9 is a flow diagram illustrating a method for determining a sound representation of a plurality of contents using MICSA by an electronic device according to an embodiment of the disclosure.

Referring to FIG. 9, the MICSA classifies input sequence (i.e., a content) including the text and the emoji into the sound labels. The MICSA consists of generating multimodal embedding followed by the twin CNN (907A, 907B) with the shared weight (907C). The MICSA learns the shared weight (907C) and the similarity score by minimizing the triplet loss function. The shared weight (907C) and the similarity score ensure that two input sequences with similar meaning and emotion lead to a higher similarity score and hence are classified into a same sound class bucket.

Due to using the shared weight (907C) in the MICSA instead of a single network led to an improvement in performance. The MICSA also leverages the relatively resource-rich language for the improvement of the resource-poor language's accuracy. Consider $X_1$ and $X_2$ be the pair of multimodal inputs, W be the shared parameters that need to be optimized, and A is the anchor input with a known label. If $X_1$ and $X_2$ belong to the same category then loss function will be small, otherwise the loss function will be large. Equation to determine the loss function is given below.

Loss function $$L(W, (A, X_1, X_2)) = \begin{cases} 0; & \text{if } s(A, X_1) - s(A, X_2) + \alpha \le 0 \\ s(A, X_1) - s(A, X_2) + \alpha; & \text{if } s(A, X_1) - s(A, X_2) + \alpha > 0 \end{cases}$$

where, $\alpha$ is the margin.

Using cosine similarity as an energy function between two sequence representations, say $v_1$ and $v_2$, can be determined using the equation given below.

$$s(v_1, v_2) = \frac{v_1 \cdot v_2}{\|v_1\| \|v_2\|}$$

For classification of unseen test sequence into the sound label, its fed into one of the sub-networks, and the highest similarity score is computed by comparing it with 'M' seen samples corresponding to 'M' sound classes.

At operation 901, the content insight determiner (112) receives the input sequence (i.e., a content) from the screen representation. At operation 902, the content insight determiner (112) generates (or creates) the textual embedding using the text. At operation 903, the content insight determiner (112) determines the textual definition of the emoji. At operation 904, the content insight determiner (112) generates (or creates) the word embedding based on the textual definition of the emoji. At operation 905, the content insight determiner (112) determines an emoji embedding using the word embedding. At operation 906, the content insight determiner (112) generates multimodal embeddings by combining the emoji embedding and the textual embedding. At operations 907-908, the content insight determiner (112) determines the similarity score of the energy functions by passing the multimodal embeddings through the twin CNN (907A, 907B) with the shared weight (907C). At operation 909, the content insight determiner (112) classifies the multimodal embeddings into one of the sound labels belonging to the sound representation based on the similarity score of the energy functions.

Figure 10:
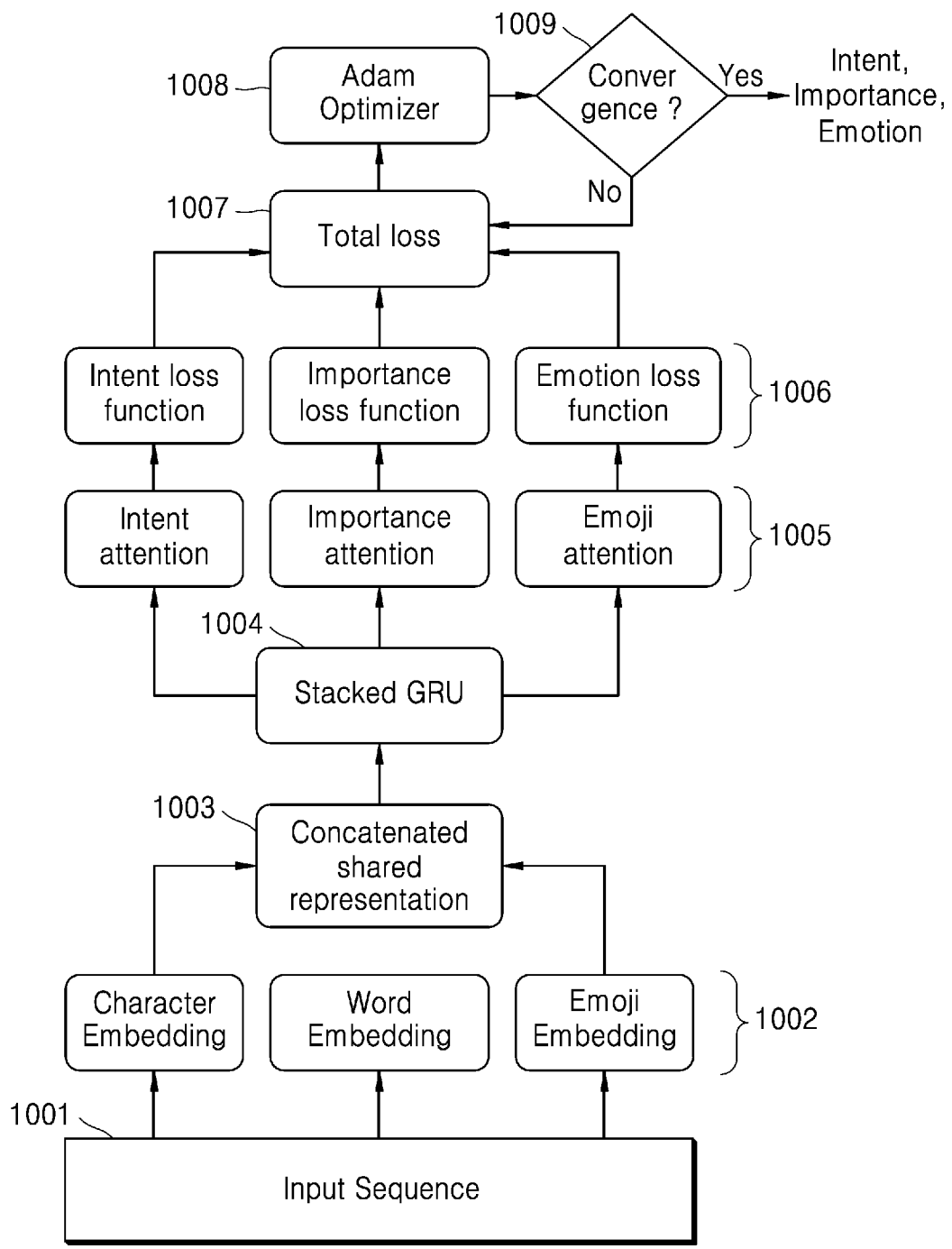
FIG. 10 is a flow diagram illustrating a method for determining intent, importance, emotion by the electronic device according to an embodiment of the disclosure.

FIG. 10 is a flow diagram illustrating a method for determining an intent, an importance, and an emotion by an electronic device according to an embodiment of the disclosure.

Referring to FIG. 10, at operation 1001, the content insight determiner (112) receives the input sequence (i.e., content) from the screen representation. At operation 1002, the content insight determiner (112) generates (or creates) the character embedding, the word embedding, and the emoji embedding from the input sequence. At operations 1003-1004, the content insight determiner (112) concatenates the character embedding, the word embedding, and the emoji embedding. At operation 1005, the content insight determiner (112) determines the intent attention, the importance attention, and the emotion attention using the stacked GRU. At operation 1006, the content insight determiner (112) determines corresponding loss function of each attention. At operation 1007, the content insight determiner (112) determines total loss using the loss function of each attention. At operations 1008-1009, the content insight determiner (112) determines whether the total loss converges at an Adam optimizer. Further, the content insight determiner (112) determines the intent, the importance, and the emotion upon determining that the total loss converges at the Adam optimizer.

Figure 11:
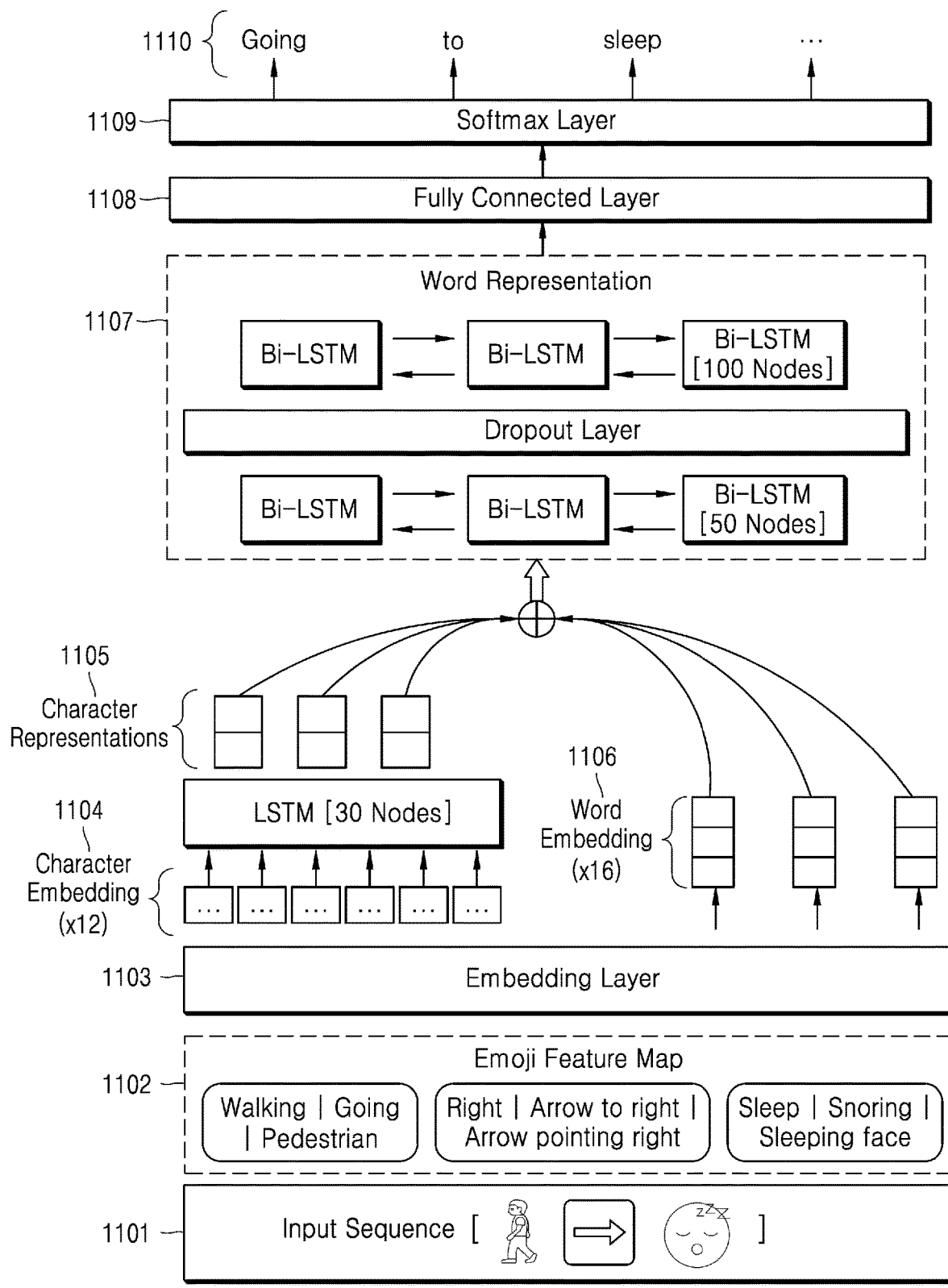
FIG. 11 is a flow diagram illustrating a method for determining information sequence of the plurality of contents by the electronic device according to an embodiment of the disclosure.

FIG. 11 is a flow diagram illustrating a method for determining information sequence of a plurality of contents by an electronic device according to an embodiment of the disclosure.

Referring to FIG. 11, at operation 1101, the content insight determiner (112) receives the input sequence (i.e., emojis) from the screen representation. At operation 1102, the content insight determiner (112) determines the textual definition (i.e., an emoji feature map) of the emojis. At operation 1103, the content insight determiner (112) generates (or creates) the embedding layer using the textual definition. At operation 1104, the content insight determiner (112) generates (or creates) the character embedding using the embedding layer. At operation 1105, the content insight determiner (112) determines character representations by passing the character embedding through LSTM nodes. For example, 12-character embedding can pass through 30 LSTM nodes. At operation 1106, the content insight determiner (112) generates (or creates) the word embedding using the embedding layer. At operation 1107, the content insight determiner (112) concatenates the character representations and the word embedding for generating the word representation. The word representation is generated by passing a concatenated value of the character representations and the word embedding through 50 bidirectional long-short term memory (Bi-LSTM) nodes followed by a dropout layer and 100 Bi-LSTM nodes. At operations 1108-1110, the content insight determiner (112) determines the information sequence by processing the word representation using the fully connected layer followed by the SoftMax layer.

2-layer Bi-LSTM is used for deeper feature learning from input sequence. Character representations help the content insight determiner (112) in better handling of spelling variations and out-of-vocabulary (OOV) words outputting them to correct emoji, where same architecture is utilized to generate complex phrases from multiple emoji combo.

Figure 12:
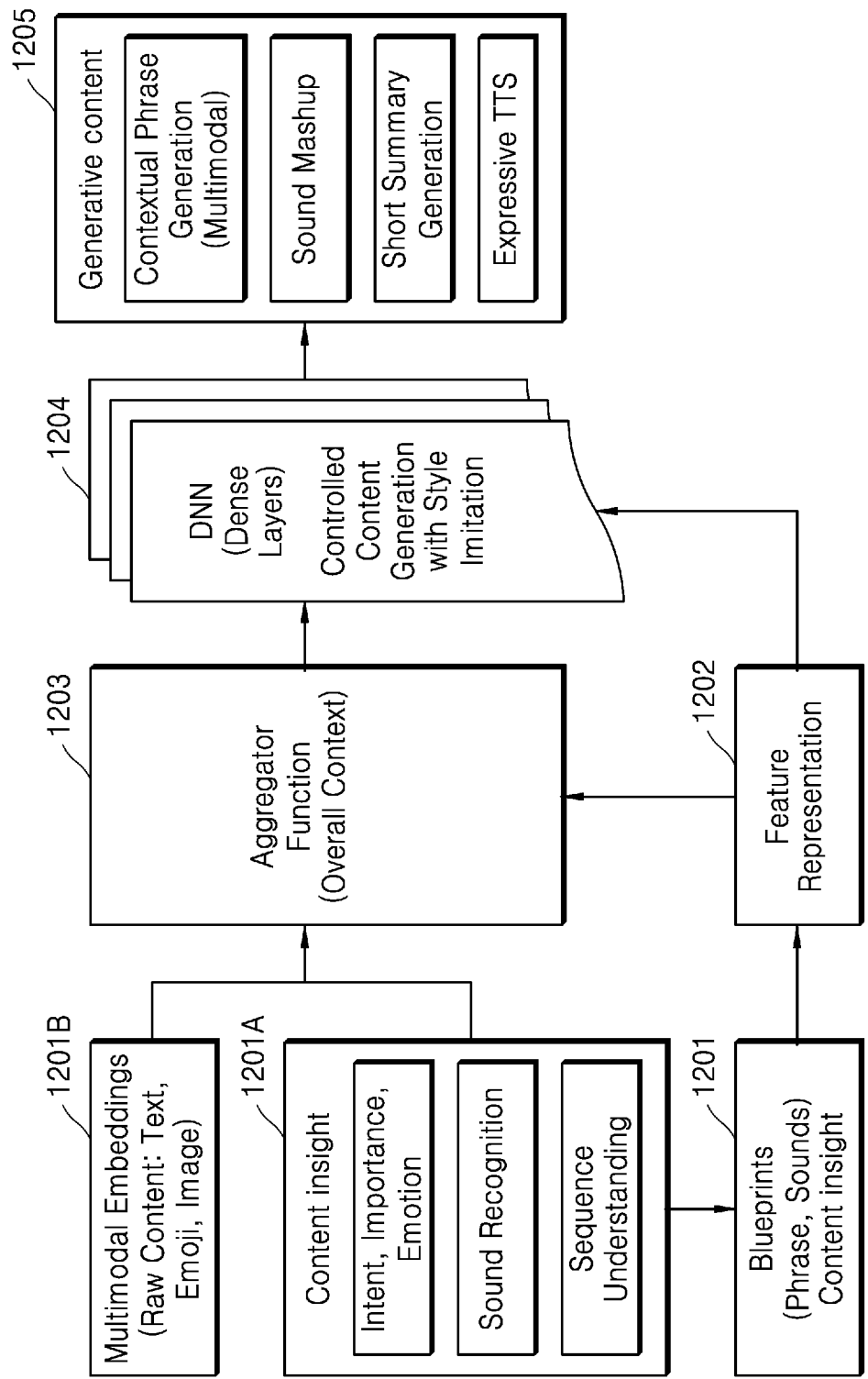
FIG. 12 is a flow diagram illustrating a method for generating the generative content by the electronic device according to an embodiment of the disclosure.

FIG. 12 is a flow diagram illustrating a method for generating a generative content by an electronic device according to an embodiment of the disclosure.

Referring to FIG. 12, at operation 1201, the generative content creator (113) determines blueprints (e.g., phrase, sounds) of the plurality of contents from the content insights (1201A) for style transfer. At operation 1202, the generative content creator (113) extracts a feature representation from the blueprints. At operation 1203, the generative content creator (113) aggregates the multimodal embeddings (i.e., a raw content includes a text, an emoji, an image, or the like) (1201B) and the content insights (1201A) and the feature representation for generating an aggregated representation. At operations 1204-1205, the generative content creator (113) controls creation of the generative content with style imitation by processing the aggregated representation using a dense neural network (DNN), where the generative content includes contextual phrase generation, sound mashup, short summary, and expressive TTS.

FIG. 13 is a flow diagram illustrating an embodiment of generating a generative content according to an embodiment of the disclosure.

Referring to FIG. 13, at operation 1301, the generative content creator (113) receives the plurality of content including the text and emojis. At operation 1302, the generative content creator (113) generates the textual embedding from the plurality of contents. At operation 1303, the generative content creator (113) determines the textual context from the textual embedding using a connected set of Bi-LSTM blocks. At operation 1304, the generative content creator (113) receives the content insights of the plurality of contents from the content insight determiner (112). At operation 1305, the generative content creator (113) identifies the emojis in the plurality of contents. At operation 1306, the generative content creator (113) determines a sound note associated with each emoji. At operation 1307, the generative content creator (113) determines the sound effects type, such as sequential, mashup, exaggeration, etc. from the content insights.

At operation 1308, the generative content creator (113) determines sound expressions of the emojis by concatenating the sound effects and the sound notes. At operation 1309, the generative content creator (113) determines the blueprints of the plurality of contents from the content insights. At operation 1310, the generative content creator (113) extracts the feature representation from the blueprints. At operation 1311, the generative content creator (113) aggregates the textual context, the concatenated representation, and the feature representation for generating the aggregated representation. Further, the generative content creator (113) processes the feature representation using the connected set of Bi-LSTM blocks. At operation 1312, the generative content creator (113) concatenates the processed feature representation with the aggregated representation. At operation 1312, the generative content creator (113) processes the concatenated value using the DNN (i.e., dense layers), generates one or more generative contents (1312A-1312C), and prioritizes the generative contents based on the intent.

Figure 14:
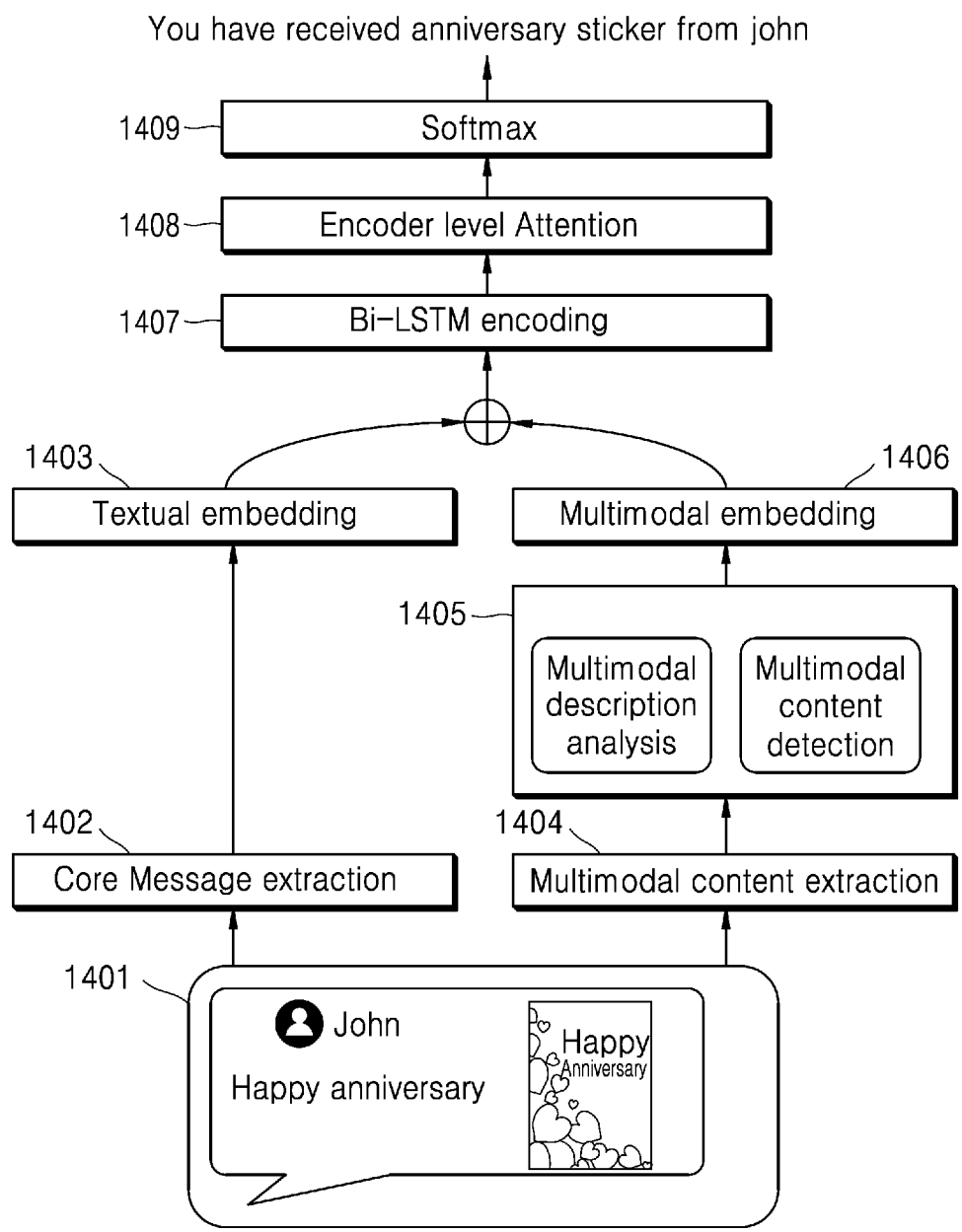
FIG. 14 is a flow diagram illustrating an embodiment of determining contextual phrases from the plurality of contents according to an embodiment of the disclosure.

FIG. 14 is a flow diagram illustrating an embodiment of determining contextual phrases from a plurality of contents according to an embodiment of the disclosure.

Referring to FIG. 14, at operation 1401, the generative content creator (113) receives a chat message that includes the text and a multimodal content (e.g., a graphics sticker). At operations 1402-1403, the generative content creator (113) extracts the text from the chat message and generates the textual embedding using the text. At operations 1404-1405, the generative content creator (113) identifies the multimodal content in the chat message, extracts the multimodal content from the chat message, and analyses the multimodal content and generates a description of the multimodal content. At operation 1406, the generative content creator (113) generates the multimodal embedding using the description of the multimodal content. At operations 1407-1409, the generative content creator (113) sequentially performs a Bi-LSTM encoding, encoder level attention, and SoftMax on a concatenated output of the multimodal embedding and the textual embedding for determining the contextual phrases.

Figure 15:
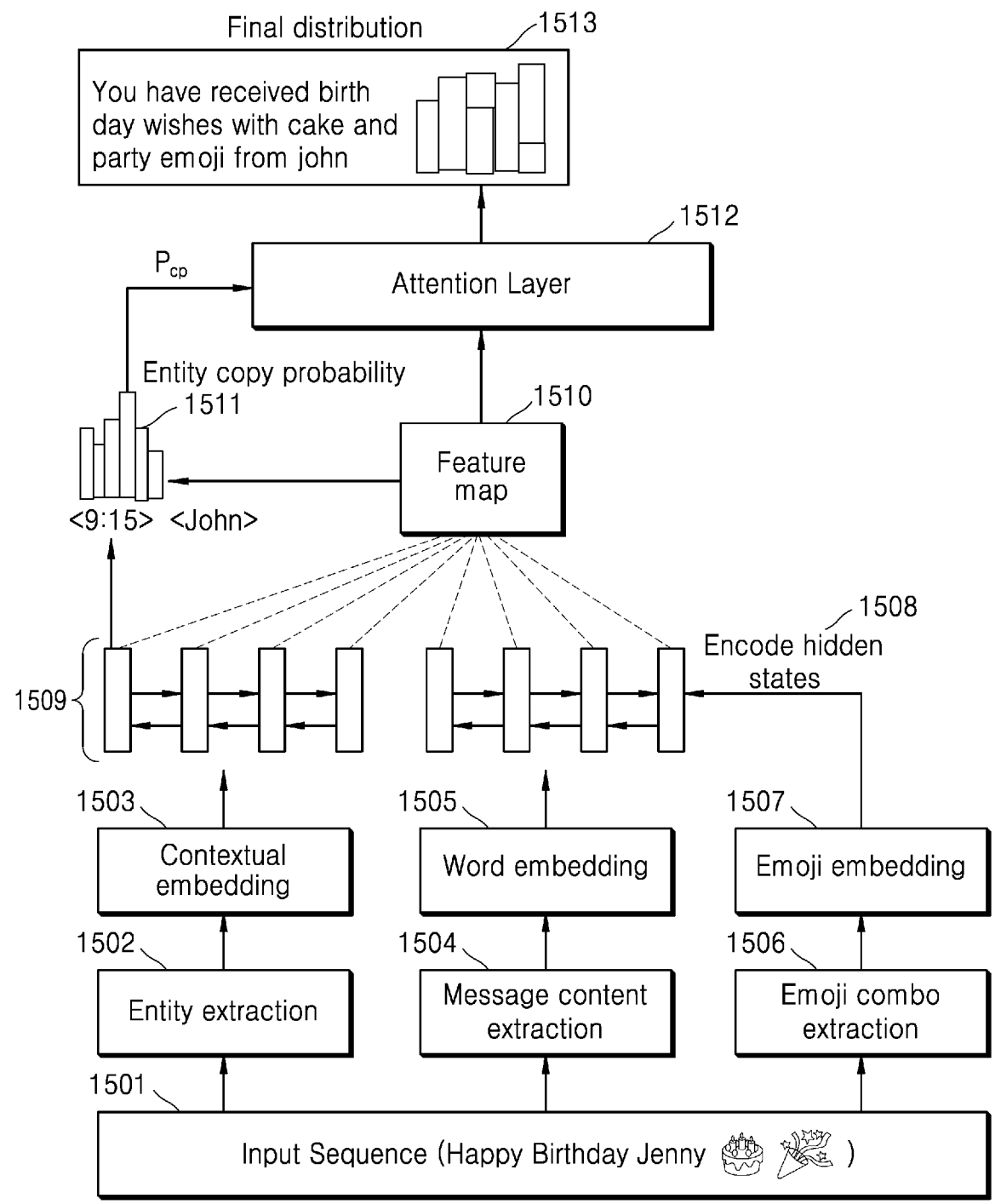
FIG. 15 is a flow diagram illustrating an embodiment of determining the contextual phrases from the plurality of contents according to an embodiment of the disclosure.

FIG. 15 is a flow diagram illustrating an embodiment of determining contextual phrases from a plurality of contents according to an embodiment of the disclosure.

Referring to FIG. 15, at operation 1501, the generative content creator (113) receives input sequence (i.e., a plurality of contents) including the text and the emojis. At operations 1502-1503, the generative content creator (113) extracts an entity mentioned in the input sequence and creates contextual embedding based on the entity. At operations 1504-1505, the generative content creator (113) extracts a message content from the input sequence and creates the word embedding based on the message content. At operations 1506-1507, the generative content creator (113) extracts emoji combinations from the input sequence and creates the emoji embedding based on the emoji combinations. At operation 1508, the generative content creator (113) encodes hidden states of the emoji embedding. At operations 1509-1511, the generative content creator (113) processes the contextual embedding, the word embedding and the encodes hidden states using the connected set of Bi-LSTM blocks, extracts the feature maps, and determines an entity copy probability. At operations 1512-1513, the generative content creator (113) passes the feature maps, and the entity copy probability through an attention layer and generates a final distribution which is the contextual phrases. For each decoder timestamp an entity copy probability (Pcp) is calculated as give below, where Pcp ∈ [0, 1].

$$P_{cp} = \sigma(w_h^T h_t + w_x^T x_t + b)$$

The entity copy probability and an attention distribution are weighted and summed to obtain the final distribution. The entity copy probability is used to choose between copying a word from entity probability distribution or next generated token from the input sequence by sampling from the attention distribution.

Figure 16:
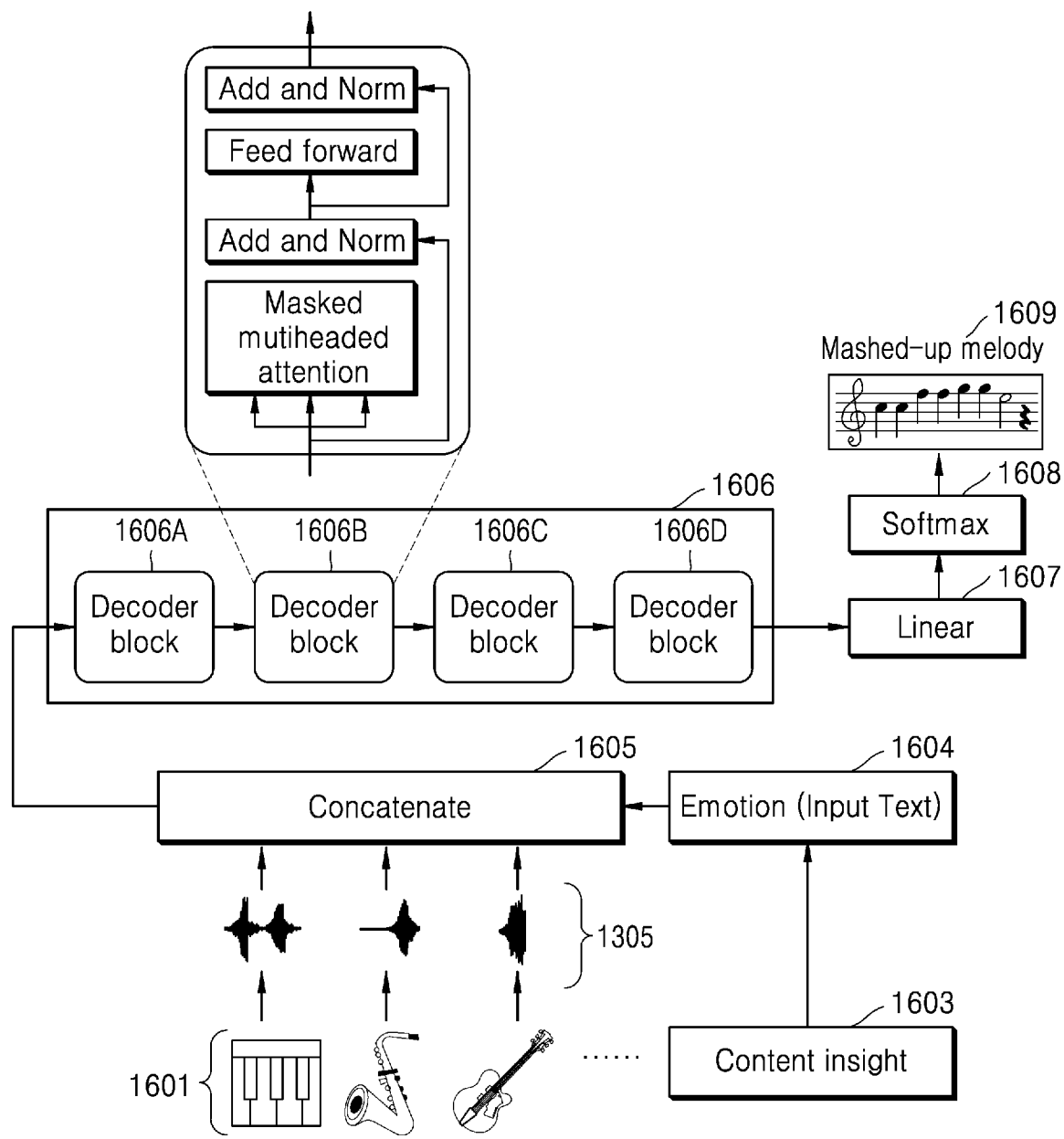
FIG. 16 is a flow diagram illustrating an embodiment of determining sound expressions from the plurality of contents according to an embodiment of the disclosure.

FIG. 16 is a flow diagram illustrating an embodiment of determining sound expressions from a plurality of contents according to an embodiment of the disclosure.

Referring to FIG. 16, at operation 1601, the generative content creator (113) identifies the emojis in the plurality of contents. At operation 1602, the generative content creator (113) determines the sound note associated with each emoji. At operations 1603-1604, the generative content creator (113) receives the content insights and determines emotion intended in the plurality of contents from the content insights. At operation 1605, the generative content creator (113) concatenates the sound notes and the emotion and provides the concatenated value to a series of decoder blocks (1606A-1606D). The decoder blocks (1606A-1606D) are an autoregressive generative model that uses primary self-attention mechanisms and learned sinusoidal position information. The generative content creator (113) combines the emotion and the sound note associated with each emoji and the output is fed to a vanilla transformer model with its encoder block and cross-attention mechanism stripped away which makes it well suited for music representation. At operation 1606, the series of decoder blocks (1606A-1606D) decodes the concatenated value. At operations 1607-1609, the generative content creator (113) processes the decoded value using a linear layer and the SoftMax, and generates a mashed-up melody which is the sound expressions.

Figure 17:
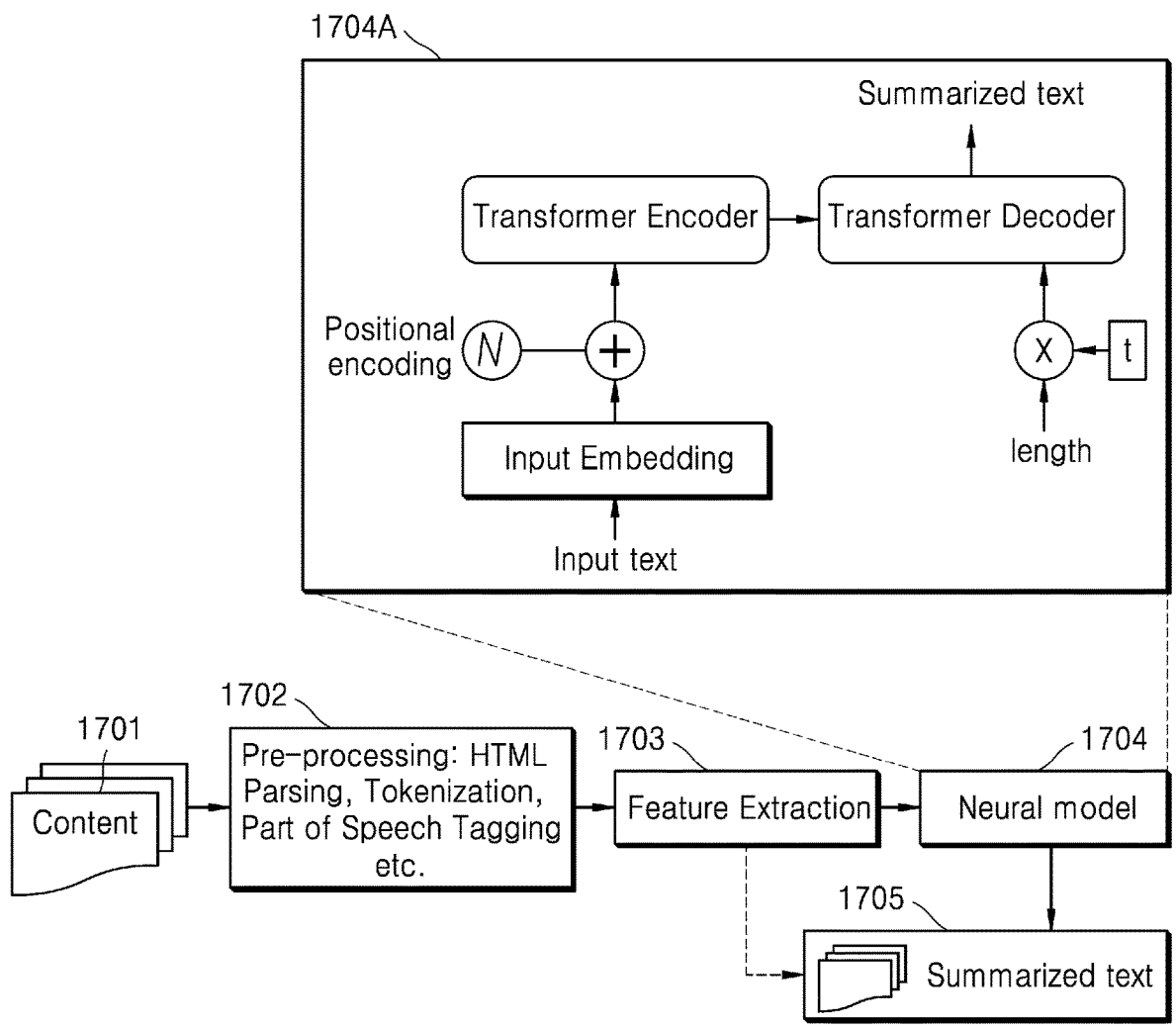
FIG. 17 is a flow diagram illustrating a method of determining a summary of the plurality of contents according to an embodiment of the disclosure.

FIG. 17 is a flow diagram illustrating a method of determining a summary of a plurality of contents according to an embodiment of the disclosure.

Referring to FIG. 17, at operations 1701-1702, the generative content creator (113) pre-processes the content upon displaying the content. Examples for pre-processing are, but are not limited to HTML parsing, tokenization, part of speech tagging etc. At operation 1703, the generative content creator (113) extracts features from the pre-processed content. At operation 1704, the generative content creator (113) uses a trained neural model (1704A) for generating the summary of the plurality of contents in form of a summarized text. The neural model (1704A) uses a memory cell of decoder to control the length by initializing states of the decoder (i.e., a memory cell m0) as follows: m0=t*length. t is a trainable vector and the length is a desired output sentence length. The neural model (1704A) manages the output length on its own using its inner state. The memory cell can learn functions, for example, subtracting a fixed amount from a particular memory cell every time a word is outputted.

Figure 18:
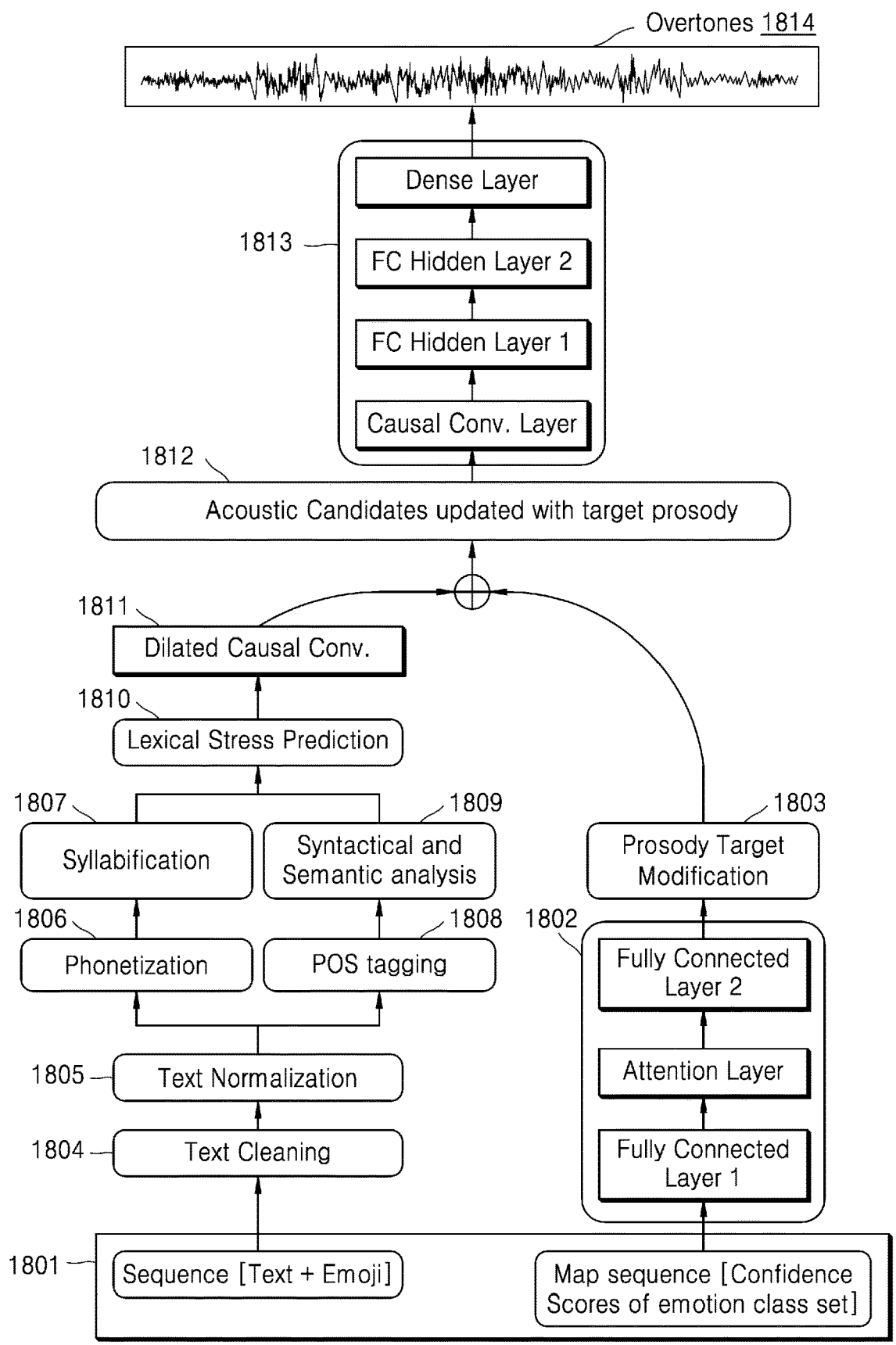
FIG. 18 is a flow diagram illustrating a method of generating emotional Text To Speech (TTS) of the plurality of contents according to an embodiment of the disclosure.

FIG. 18 is a flow diagram illustrating a method of generating emotional text-to-speech (TTS) of a plurality of contents according to an embodiment of the disclosure.

Referring to FIG. 18, at operation 1801, the generative content creator (113) receives the input sequence includes the text and the emoji, and a map sequence includes confidence scores of emotion class set. At operation 1802, the generative content creator (113) processes the map sequence using a Fully Connected (FC) layer 1, an attention layer, and a FC layer 2, for obtaining prosody that includes pitch, duration, energy. At operation 1803, the generative content creator (113) modifies the prosody for obtaining a target prosody. At operation 1804, the generative content creator (113) cleans the text in the input sequence by removing mark-up not to be synthesized. At operation 1805, the generative content creator (113) normalizes the cleaned text by transforming number, dates abbreviations, etc. in the cleaned text to normal orthographic form. At operations 1806-1807, the generative content creator (113) performs phonetization and syllabification on the normalized text. The phonetization includes grapheme-to-morpheme conversion on the normalized text.

At operations 1808-1809, the generative content creator (113) performs POS tagging, and syntactical and semantic analysis on the normalized text. At operations 1810-1811, the generative content creator (113) performs lexical stress prediction, and dilated causal convolution on the outputs obtained from the syllabification step and the syntactical and semantic analysis step, and generates acoustic candidates by predicting relevant acoustic waveform units. At operation 1812, the generative content creator (113) updates the acoustic candidates with the target prosody. At operation 1813, the generative content creator (113) generates individual audio sample by performing autoregressive generation using a causal convolution layer, a FC hidden layer 1, a FC hidden layer 2, and a dense layer, such that each sample is conditioned on all preceding samples using the equation given below.

$$p(X) = \prod_{i=0}^{T-1} p(x_{i+1} \mid x_1, \ldots, x_i)$$

At operation 1814, the generative content creator (113) combines the individual audio sample and generates speech with emotional overtones.

FIGS. 19A, 19B, 19C, 19D, and 19E illustrate a comparison of reading contents by a device of the related art and a proposed electronic device according to various embodiments of the disclosure.

Figure 19A:
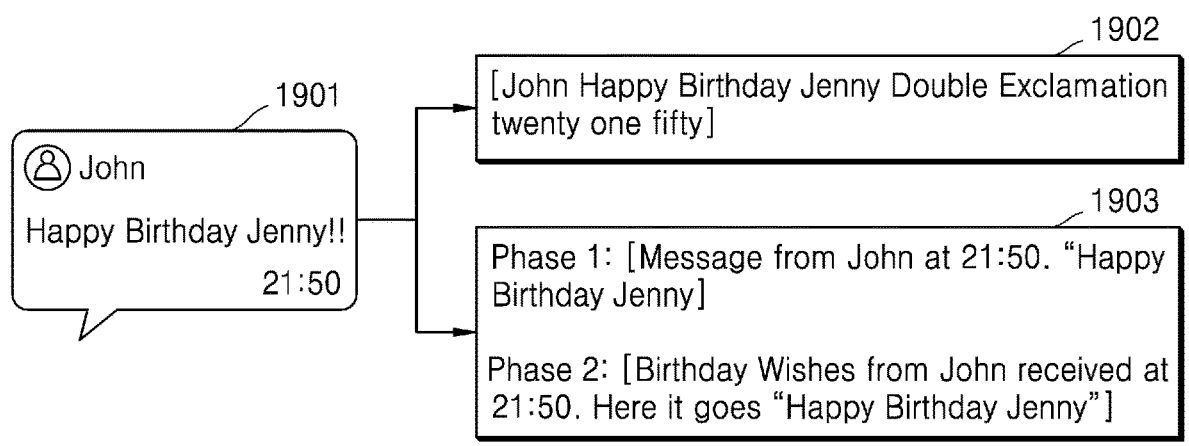
FIGS. 19A, 19B, 19C, 19D, and 19E illustrate a comparison of reading contents by a device of the related art and the proposed electronic device according to various embodiments of the disclosure.

Referring to FIG. 19A, at 1901, consider the device of the related art and the proposed electronic device (100) are displaying a birthday greeting message of john at 21.50. At 1902, the device of the related art reads aloud the view as "John Happy Birthday Jenny Double Exclamation twenty-one fifty" which confuses the user, whereas at 1903 the proposed electronic device (100) gives clarity about the birthday greeting message to the user by intelligently reading aloud the view as either "Message from John at 21:50. "Happy Birthday Jenny or "Birthday Wishes from John received at 21:50. Here it goes "Happy Birthday Jenny".

Figure 19B:
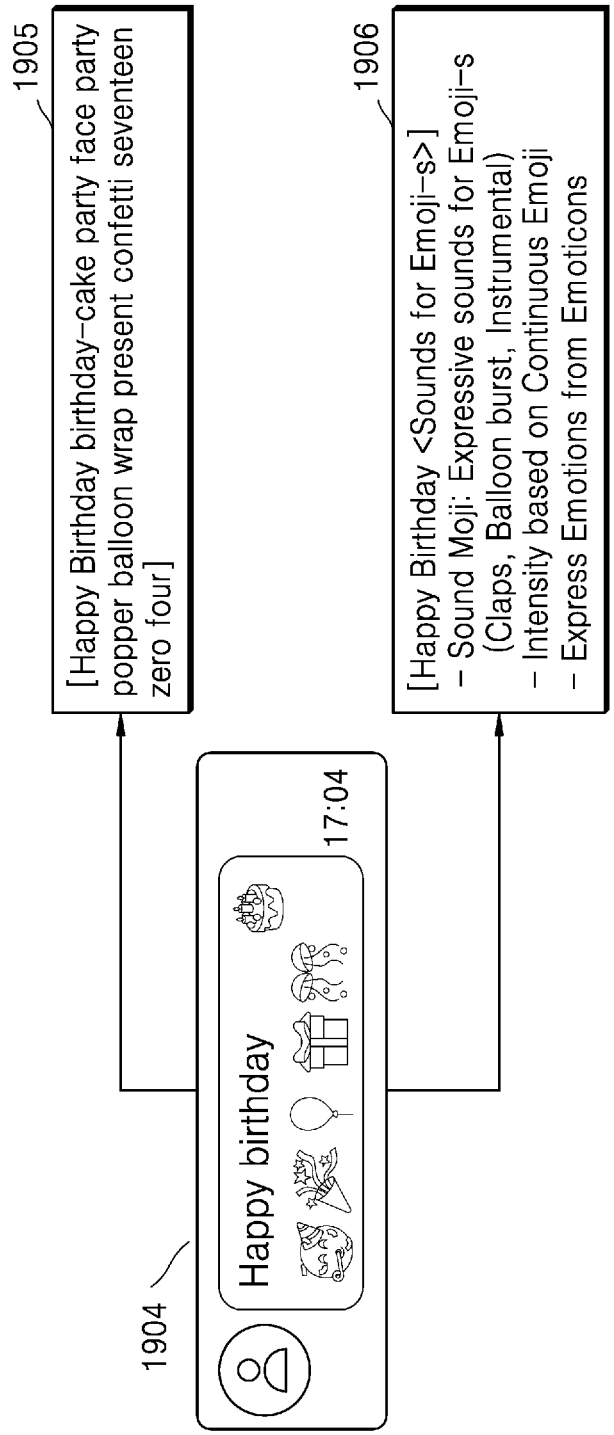

Referring to FIG. 19B, at 1904, consider the device of the related art and the proposed electronic device (100) are displaying the birthday greeting message with emojis. At 1905, the device of the related art reads aloud the view as "Happy Birthday, birthday cake, party face, party popper, balloon, wrap present, confetti, seventeen zero four" which confuses the user, whereas at 1906 the proposed electronic device (100) gives clarity about the birthday greeting message with the emojis to the user by intelligently reading aloud the view as "Happy Birthday" and generates expressive sounds of emojis includes claps sound, balloon burst sound, instrumental sound, where an intensity of the sound varies based on presence of same emoji continuously, and express emotions in the expressive sounds from emoticons.

Figure 19C:
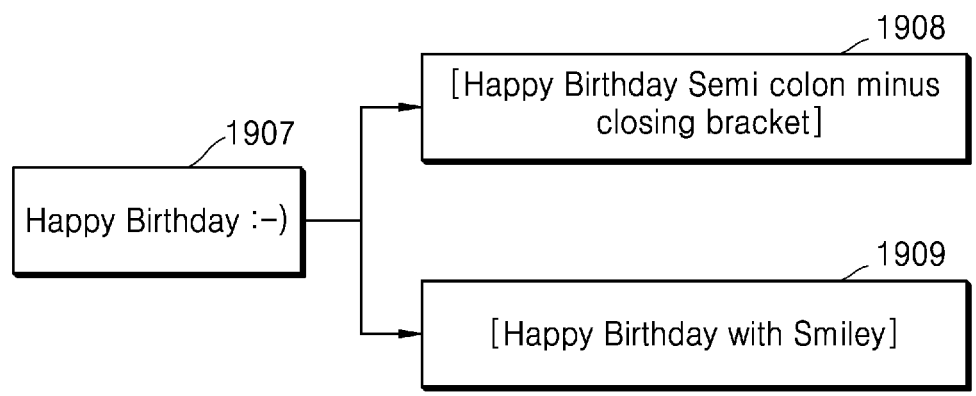

Referring to FIG. 19C, at 1907, consider the device of the related art and the proposed electronic device (100) are displaying the birthday greeting with a code of a smiley. At 1908, the device of the related art reads aloud the view as "Happy Birthday, semi colon minus closing bracket", whereas at 1909 the proposed electronic device (100) gives clarity about the birthday greeting with the code of the smiley to the user by intelligently reading aloud the view as "Happy Birthday with Smiley".

Figure 19D:
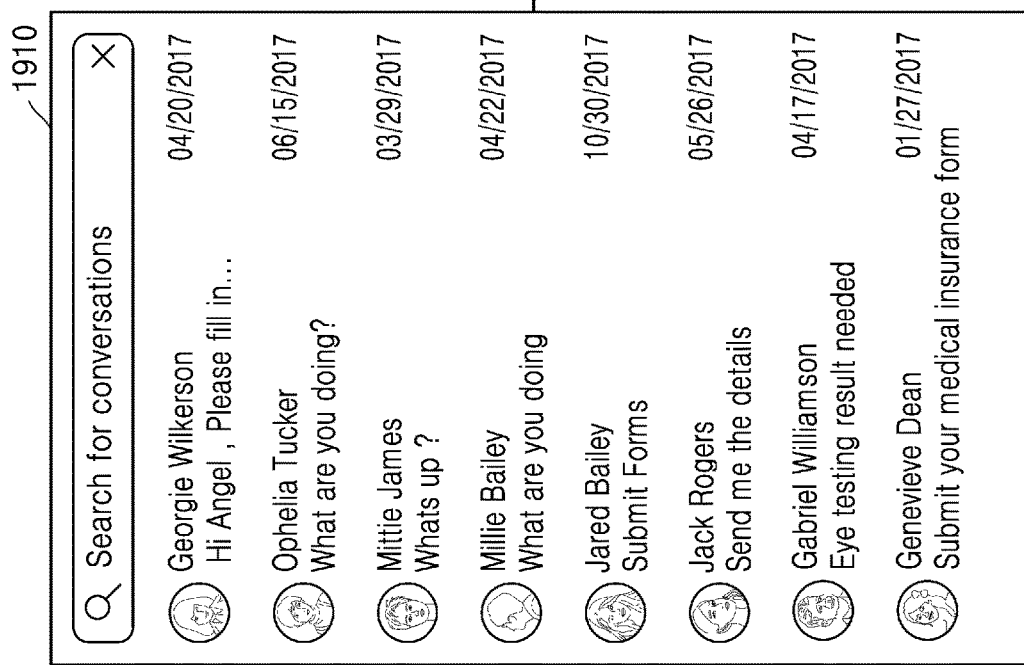

Referring to FIG. 19D, at 1910, consider the device of the related art and the proposed electronic device (100) are displaying first eight contacts out of four hundred thirty-five contacts in a contact application. At 1911, the device of the related art reads aloud the view as "Showing items one to eight of item four hundred thirty-five" which does not give a clear information to the user, whereas at 1912 the proposed electronic device (100) gives clarity to the user by intelligently reading aloud the view as "Showing first eight contacts".

Figure 19E:
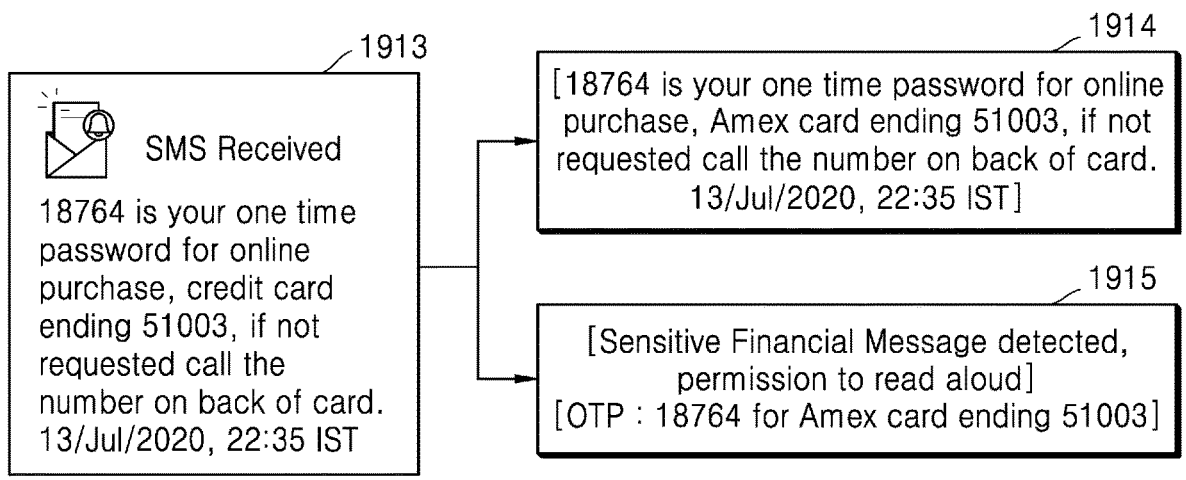

Referring to FIG. 19E, at 1913, consider the device of the related art and the proposed electronic device (100) are displaying a Short Message Service (SMS) contains a one-time password for online purchase initiated using a credit card. At 1914, the device of the related art reads aloud the view as "18764 is your one-time password for online purchase, Amex card ending 51003, if not requested call the number on back of card. 13 Jul. 2020, 22:35 IST" which spoils confidentiality of the one-time password, whereas at 1912 the proposed electronic device (100) intelligently reads aloud the view as "Sensitive Financial Message detected, permission to read aloud" which maintains the confidentiality of the one-time password. Further, upon receiving the permission from the user, the proposed electronic device (100) reads aloud the one-time password.

At 1915, the device of the related art reads text available on the screen (150), which is complex for differently-abled people to understand what is being read on the screen. The proposed electronic device (100) understands significant and unimportant content, understands sensitivity of the content, generates phrases by understanding entities, and brings expressive-ability for the content.

Figure 20A:
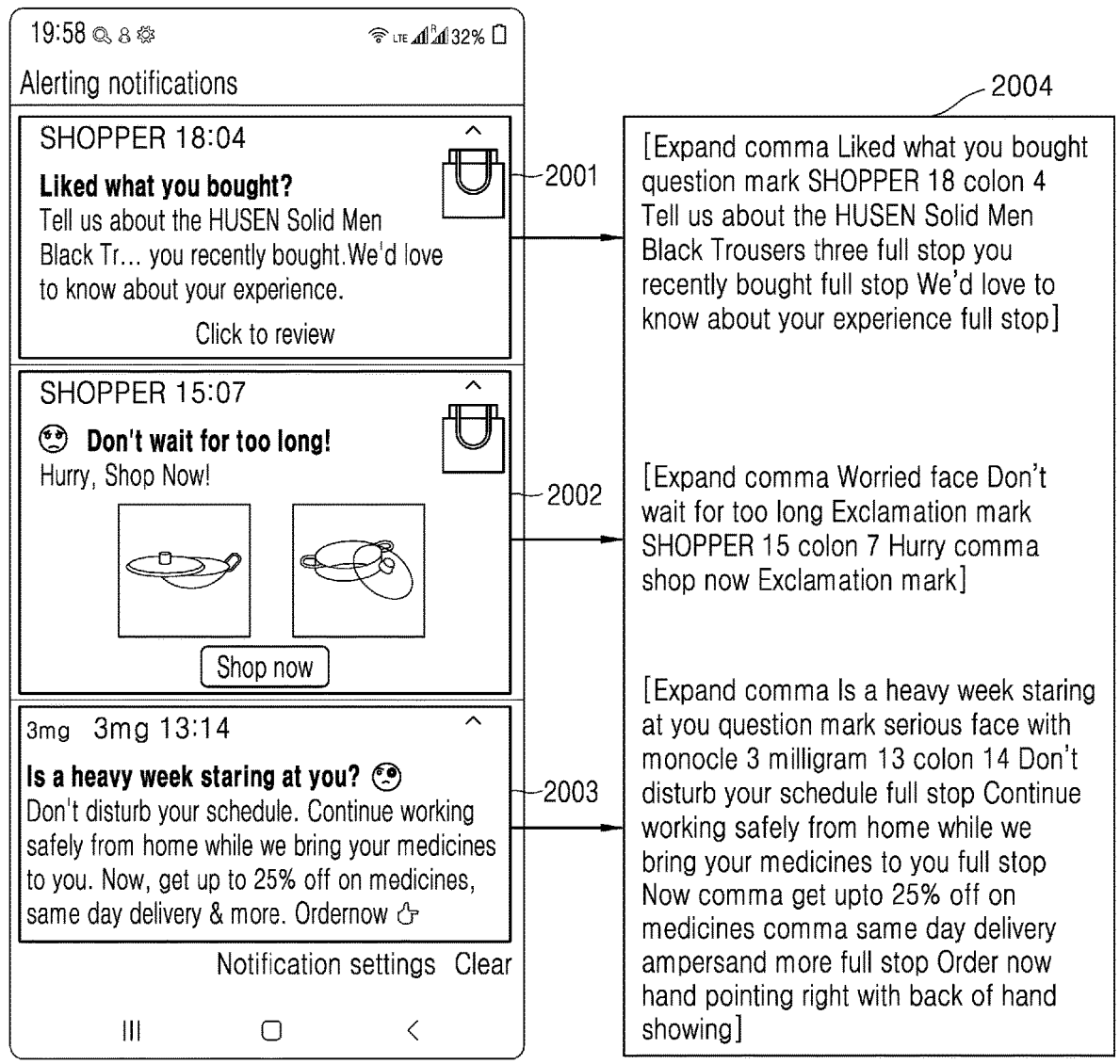
FIGS. 20A and 20B illustrate a comparison of reading the contents in a notification window by the device of the related art and the proposed electronic device according to various embodiments of the disclosure.
Figure 20B:
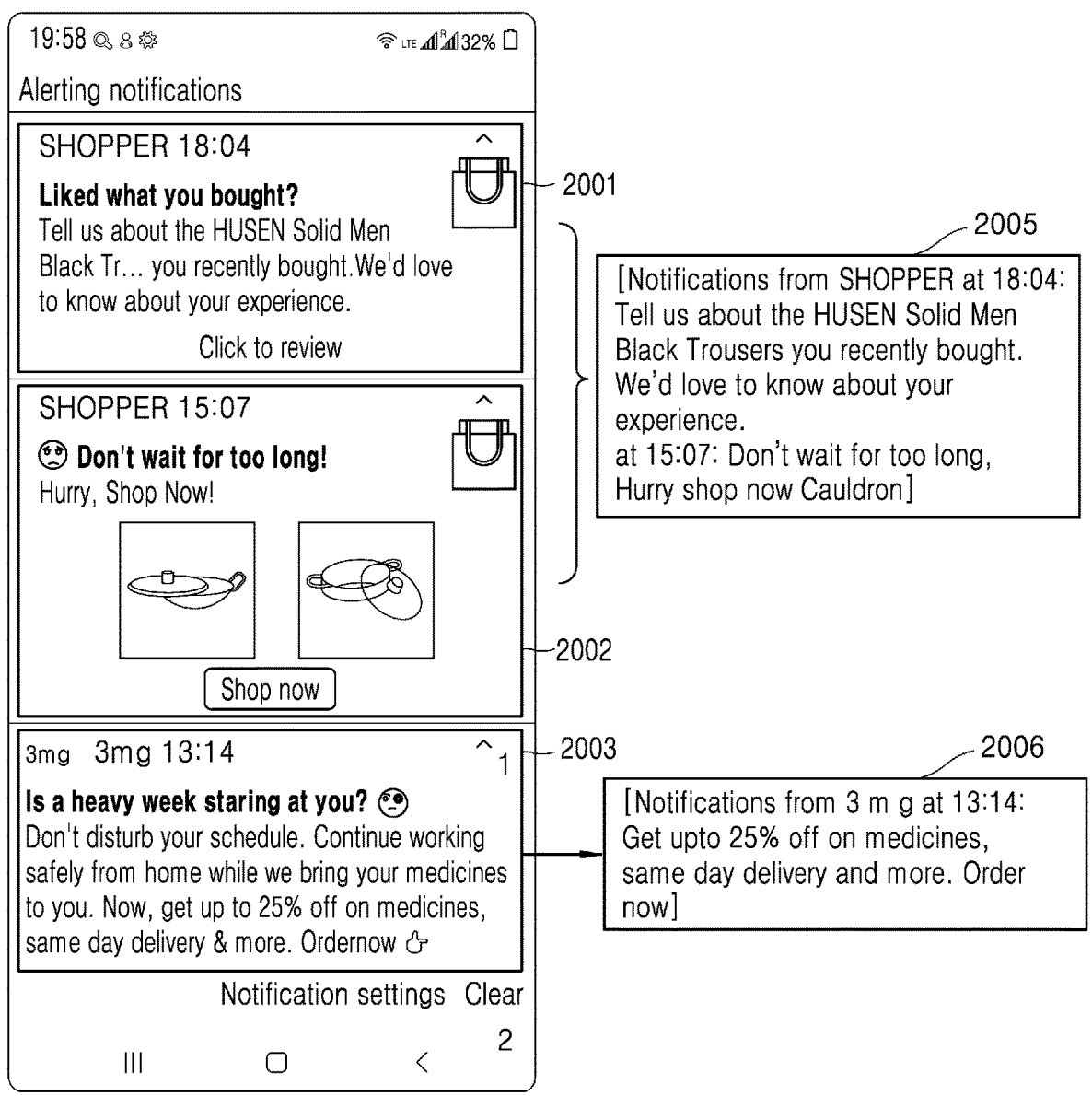

FIGS. 20A and 20B illustrate a comparison of reading contents in a notification window by a device of the related art and a proposed electronic device according to various embodiments of the disclosure. Consider the device of the related art and the proposed electronic device (100) are displaying notification window including two notifications (2001, 2002) of an online crockery and apparel shopping application (named as SHOPPER), and a notification (2003) of an online medicine purchasing application (named as 3 m g).

Referring to FIG. 20A, at 2004 the device of the related art reads aloud each notification (2001-2003) without continuity upon selecting each view for reading by the user as "Expand comma Liked what you bought question mark SHOPPER colon 4 Tell us about the HUSEN Solid Men Black Trousers three full stop you recently bought full stop We'd love to know about your experience full stop" "Expand comma Worried face Don't wait for too long Exclamation mark SHOPPER 15 colon 7 Hurry comma shop now Exclamation mark" "Expand comma Is a heavy week staring at you question mark serious face with monocle 3 milligram 13 colon 14 Don't disturb your schedule full stop Continue working safely from home while we bring your medicines to you full stop Now comma get up to 25% off on medicines comma same day delivery ampersand more full stop Order now hand pointing right with back of hand showing". In addition, the device of the related art reads unimportant text components in the notifications (2001-2003).

Unlike the device of the related art, the proposed electronic device (100) analyses the same class relations (i.e., a notification (2001, 2002) and merges view contents, identifies the unimportant portions (e.g., Is a heavy week staring at you, continue working safely from home while we bring your medicines to you) in the notifications, understands emotions from the emoji (e.g., worried, pondering), detects images (e.g., Cauldron), generates the short summary of a long text in the notification, and uses expressive sounds based on emoticons (e.g., worry sound).

Referring to FIG. 20B, the proposed electronic device (100) identifies that the two notifications (2001, 2002) belong to the online crockery and apparel shopping application, and the notification (2003) belongs to the online medicine purchasing application. At 2005 the proposed electronic device (100) reads aloud two notifications (2001, 2002) with continuity as "Notifications from SHOPPER:— at 18:04: Tell us about the HUSEN Solid Men Black Trousers you recently bought. We'd love to know about your experience, at 15:07: Don't wait for too long, Hurry shop now Cauldron". At 2006 the proposed electronic device (100) reads aloud the notification (2003) as "Notifications from three m g at 13:14:—Get up to 25% off on medicines, same day delivery and more. Order now".

Referring to FIG. 20A, at 2001-2002, consider the device of the related art and the proposed electronic device (100) are displaying a SMS containing a one-time password for online purchase initiated using a credit card. At 1914, the device of the related art reads aloud the view as "18764 is your one-time password for online purchase, Amex card ending 51003, if not requested call the number on back of card. 13 Jul. 2020, 22:35 IST" which spoils confidentiality of the one-time password, whereas at 1912 the proposed electronic device (100) intelligently reads aloud the view as "Sensitive Financial Message detected, permission to read aloud" which maintains the confidentiality of the one-time password. Further, upon receiving the permission from the user, the proposed electronic device (100) reads aloud the one-time password.

Figure 21:
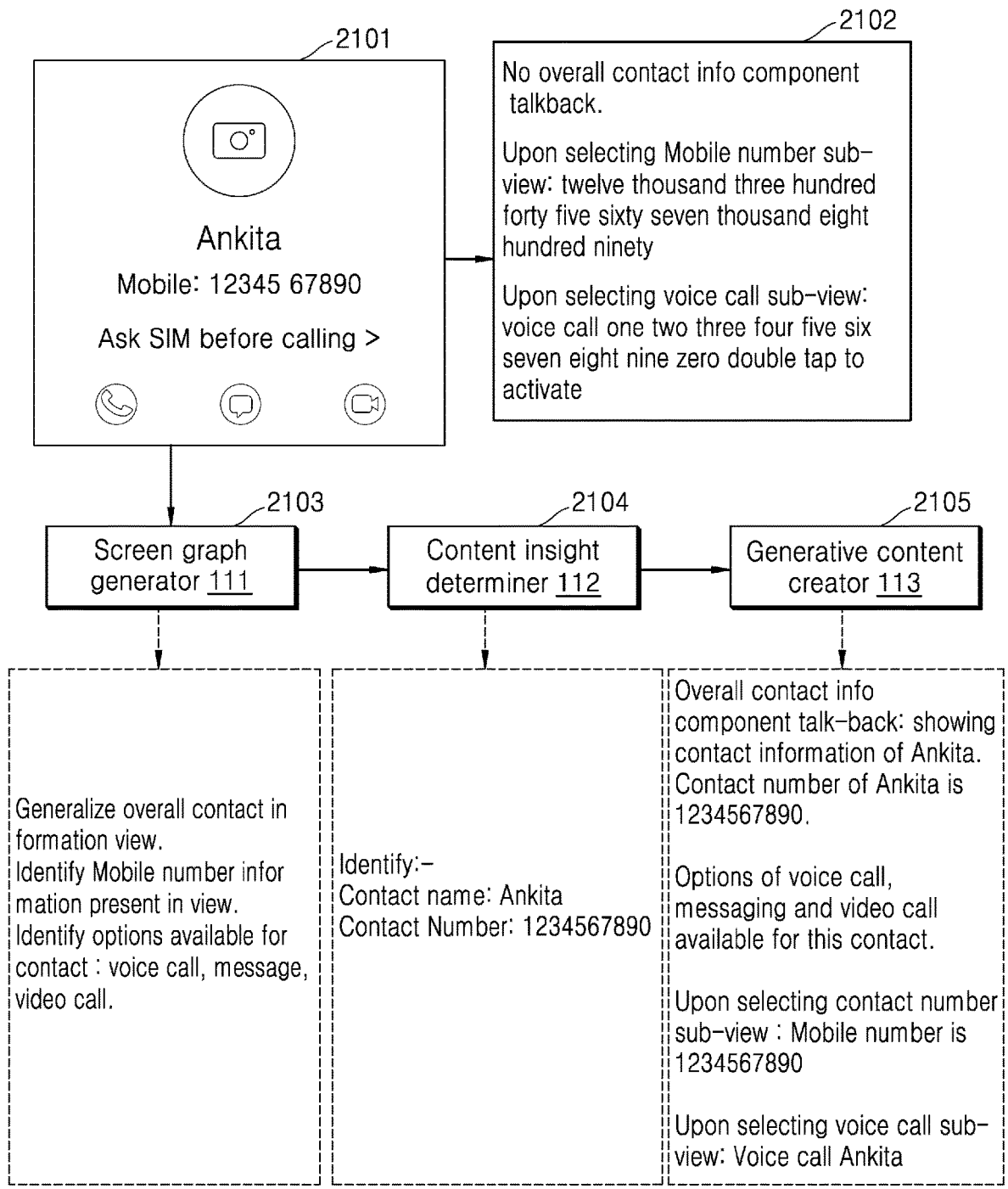
FIG. 21 illustrates a comparison of reading the contents of a contact in a contact application by the device of the related art and the proposed electronic device according to an embodiment of the disclosure.

FIG. 21 illustrates a comparison of reading contents of a contact in a contact application by a device of the related art and a proposed electronic device according to an embodiment of the disclosure.

Referring to FIG. 21, at 2101, consider the device of the related art and the proposed electronic device (100) are displaying the contact in the contact application. At 2102, the device of the related art does not read aloud overall contact info component. Upon selecting a mobile number sub-view of the contact, the device of the related art reads aloud as "twelve thousand three hundred, forty-five, sixty-seven thousand eight hundred ninety". Upon selecting a voice call sub-view of the contact, the device of the related art reads aloud as "voice call one two three four five six seven eight nine zero double tap to activate".

Unlike to the device of the related art, at 2103 the screen graph generator (111) of the proposed electronic device (100) generalizes the overall contact information view, identifies mobile number information present in the view, and identifies options available for contact including a voice call, a message, and a video call. At 2104, the content insight determiner (112) of the proposed electronic device (100) identifies a contact name (e.g., Ankita) and a contact number (e.g., 12345 67890). At 2105, the generative content creator (113) of the proposed electronic device (100) reads aloud the overall contact information including the contact name and the contact number, options of the voice call, the messaging, and the video call available for the contact. Upon selecting the contact number sub-view by the user, the generative content creator (113) reads aloud as "contact number is 1234567890". Upon selecting the voice call sub-view by the user, the generative content creator (113) reads aloud as "Voice call Ankita".

Figure 22:
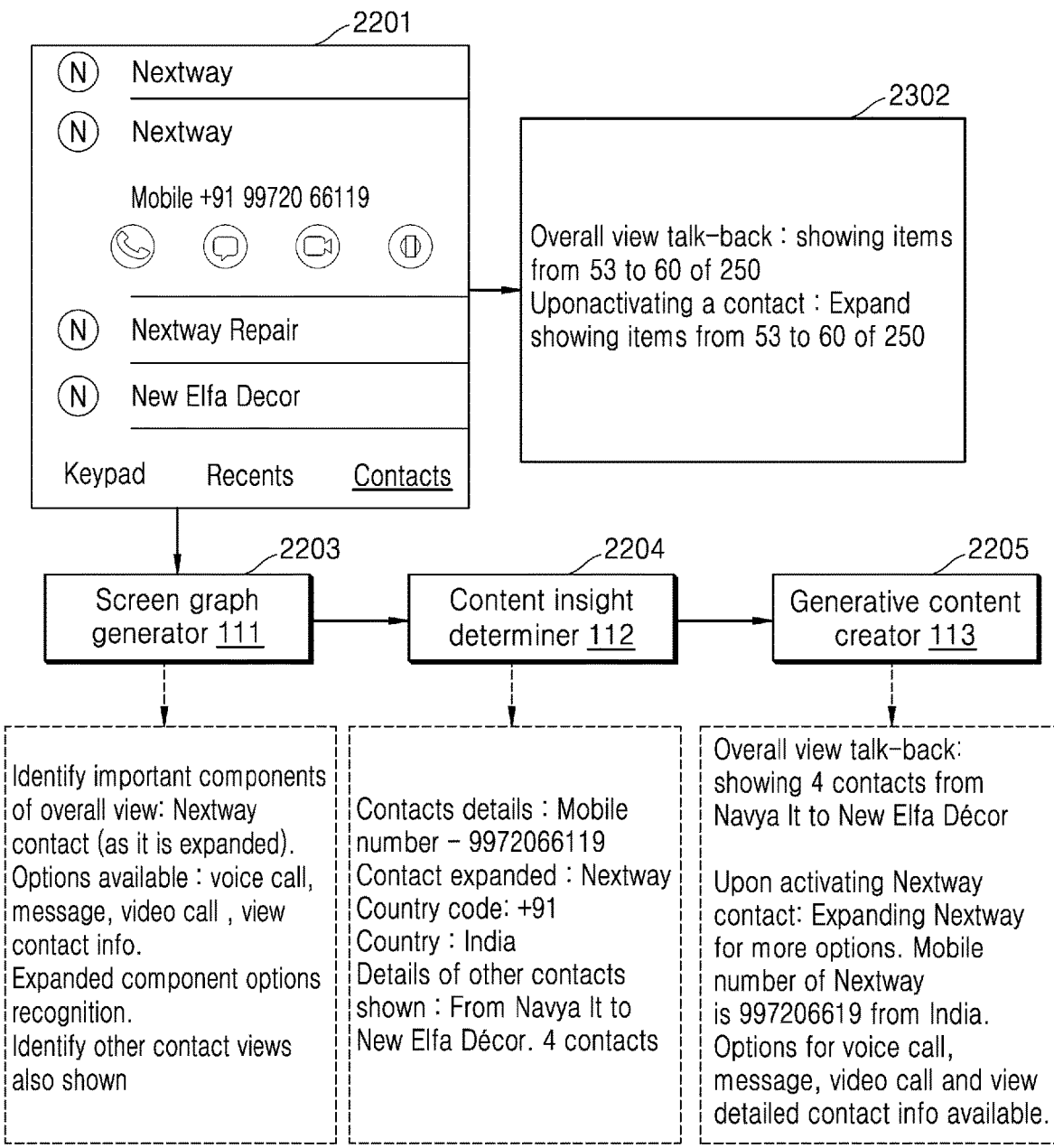
FIG. 22 illustrates a comparison of reading the contents of a list of contacts in the contact application by the device of the related art and the proposed electronic device according to an embodiment of the disclosure.

FIG. 22 illustrates a comparison of reading a contents of a list of contacts in a contact application by a device of the related art and a proposed electronic device according to an embodiment of the disclosure.

Referring to FIG. 22, at 2201, consider the device of the related art and the proposed electronic device (100) are displaying the list of contacts in the contact application. At 2202, the device of the related art reads aloud overall view of the list of contacts in the contact application as "showing items from 53 to 60 of 250". Upon selecting one contact from the list by the user, the device of the related art reads aloud as "expand showing items from 53 to 60 of 250".

Unlike to the device of the related art, at 2203 the screen graph generator (111) of the proposed electronic device (100) recognizes that a contact "Nextway" is expanded by the user, and identifies important components of an overall view of the Nextway contact, the options available include the voice call, the message, the video call, the view contact information, and other contact views shown. At 2204, the content insight determiner (112) of the proposed electronic device (100) identifies contacts details of the contact "Nextway" including the contact number as 9972066119, contact name as Nextway, Country code as +91, a country as India, and details of other 4 contacts shown from a contact "Navya It" to a contact "New Elfa Décor". At 2205, the generative content creator (113) of the proposed electronic device (100) reads aloud the overall view showing 4 contacts from the contact "Navya It" to the contact "New Elfa Décor". Upon selecting the contact "Nextway" by the user, the generative content creator (113) reads aloud the options of the contact "Nextway" as "contact number of Nextway is 997206619 from India". Further, the generative content creator (113) reads aloud the options for voice call, message, video call and views detailed contact info available.

Figure 23:
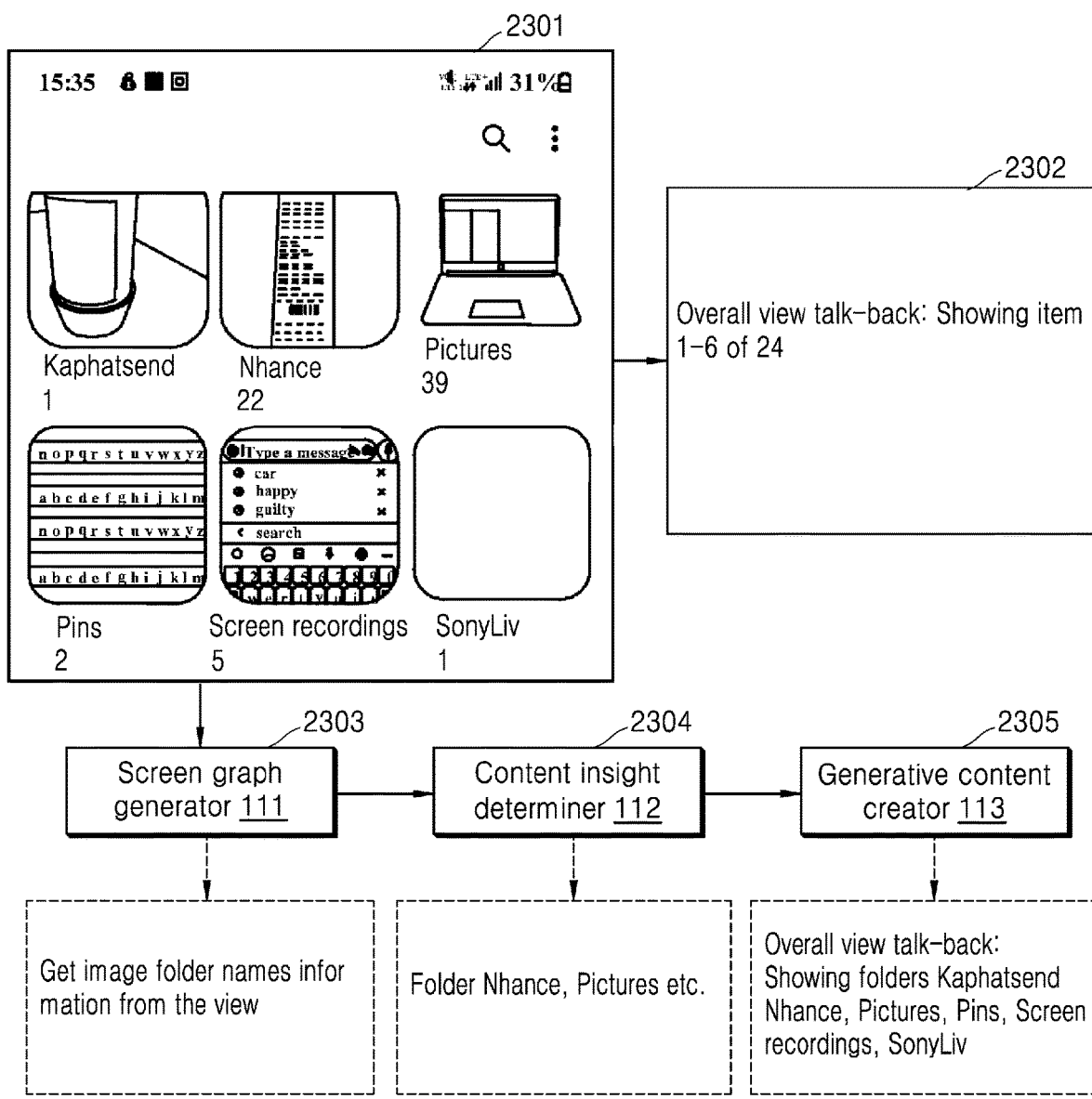
FIG. 23 illustrates a comparison of reading the contents of gallery application by the device of the related art and the proposed electronic device according to an embodiment of the disclosure.

FIG. 23 illustrates a comparison of reading contents of a gallery application by a device of the related art and a proposed electronic device according to an embodiment of the disclosure.

Referring to FIG. 23, at 2301, consider the device of the related art and the proposed electronic device (100) are displaying the contents of the gallery application. At 2302, the device of the related art reads aloud the overall view as "Showing item 1-6 of 24".

Unlike to the device of the related art, at 2303 the screen graph generator (111) of the proposed electronic device (100) obtains information of folders in the gallery from the view. At 2304, the content insight determiner (112) of the proposed electronic device (100) determines the folder names as Folder Nhance, pictures, etc. At 2305, the generative content creator (113) of the proposed electronic device (100) reads aloud as "Showing folders Kaphatsend, Nhance, Pictures, Pins, Screen recordings, S onyLiv".

Figure 24:
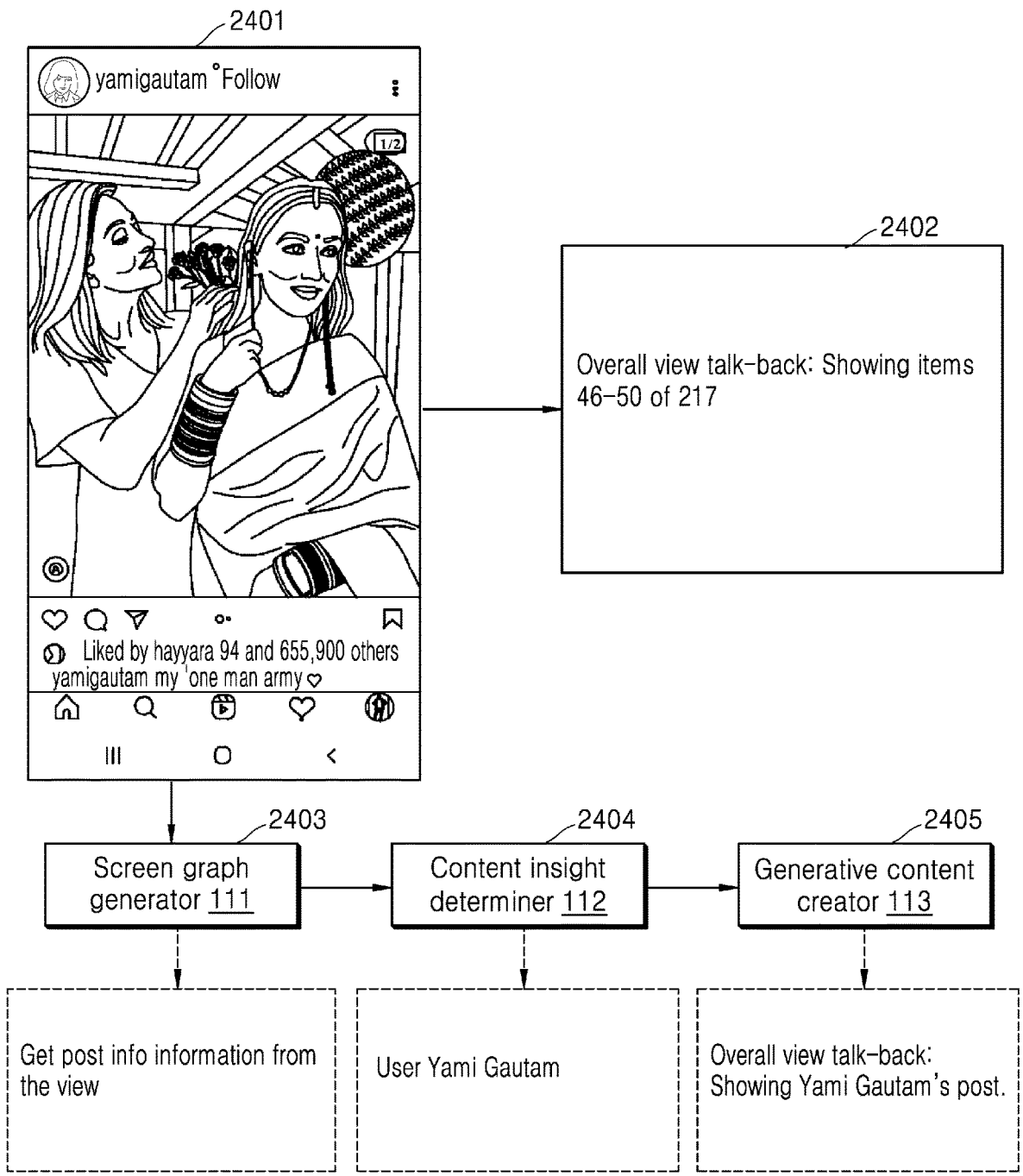
FIG. 24 illustrates a comparison of reading the contents of a social media application by the device of the related art and the proposed electronic device according to an embodiment of the disclosure.

FIG. 24 illustrates a comparison of reading contents of a social media application by a device of the related art and a proposed electronic device according to an embodiment of the disclosure.

Referring to FIG. 24, At 2401, consider the device of the related art and the proposed electronic device (100) are displaying a social media post including an image and name of a person (i.e., Yami Gautam) posted the image in the social media application. At 2402, the device of the related art reads aloud the overall view of the social media application as "Showing items 46-50 of 217".

Unlike to the device of the related art, at 2403 the screen graph generator (111) of the proposed electronic device (100) obtains post information from the view. At 2404, the content insight determiner (112) of the proposed electronic device (100) identifies the name of the person posted the image in the social media application. At 2405, the generative content creator (113) of the proposed electronic device (100) reads aloud the overall view of the social media application as "Showing Yami Gautam's post".

Figure 25:
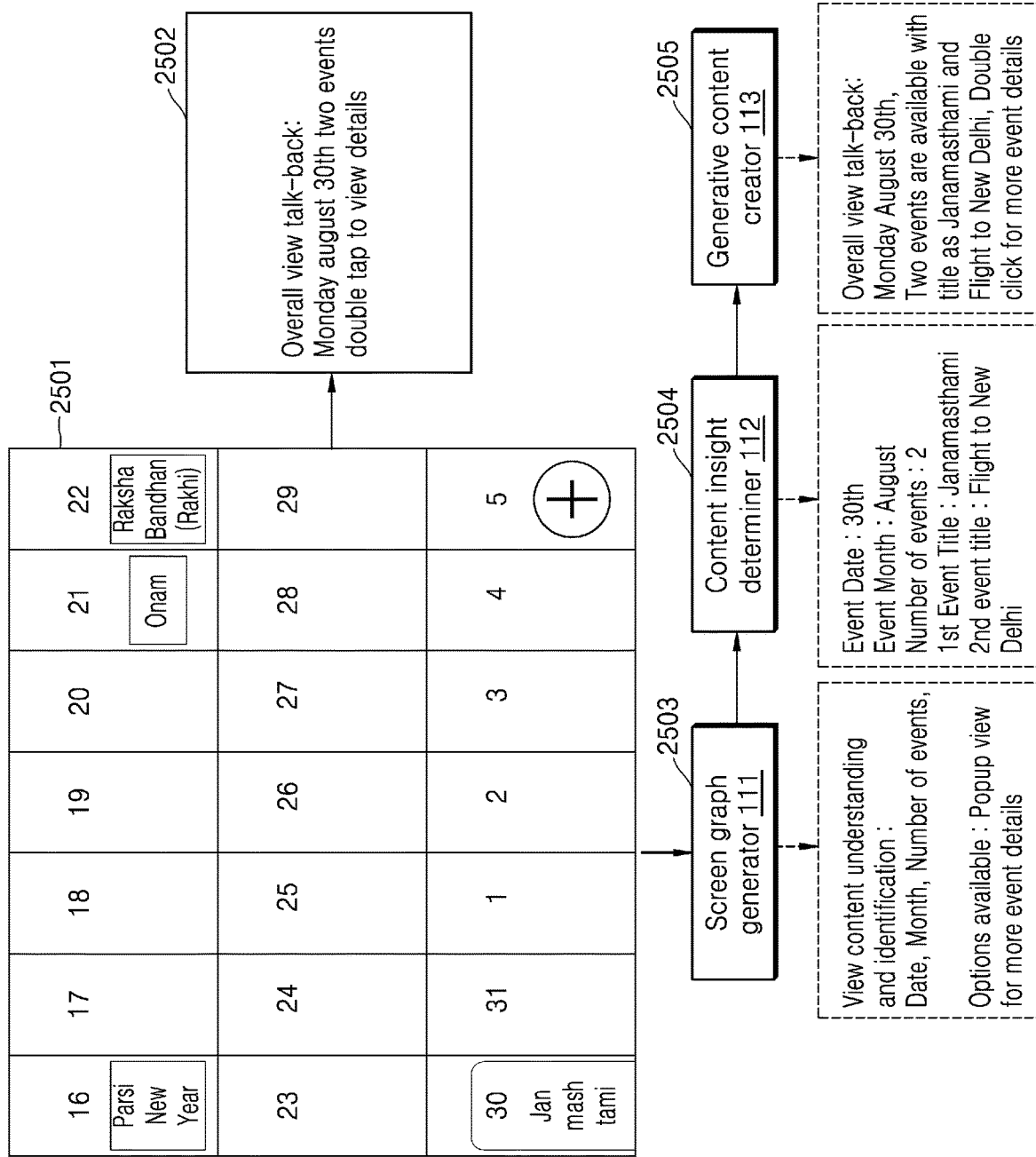
FIG. 25 illustrates a comparison of reading the contents of a calendar application by the device of the related art and the proposed electronic device according to an embodiment of the disclosure.

FIG. 25 illustrates a comparison of reading contents of a calendar application by a device of the related art and a proposed electronic device according to an embodiment of the disclosure.

Referring to FIG. 25, at 2501, consider the device of the related art and the proposed electronic device (100) are displaying the calendar application. At 2502, the device of the related art reads aloud the overall view of the calendar application as "Monday august 30th two events double tap to view details".

Unlike to the device of the related art, at 2503 the screen graph generator (111) of the proposed electronic device (100) identifies and understands the content in the view of the calendar application includes date, month, number of events, event details and available options include popup view for more event details. At 2504, the content insight determiner (112) of the proposed electronic device (100)

identifies event date as 30th, event month as august, number of events as 2, 1st event title as Janmashtami, and 2nd event title as flight to New Delhi from the view of the calendar application. At 2505, the generative content creator (113) of the proposed electronic device (100) reads aloud the overall view of the calendar application as "Monday August 30th, Two events are available with title as Janmashtami and flight to New Delhi, double click for more event details".

Figure 26:
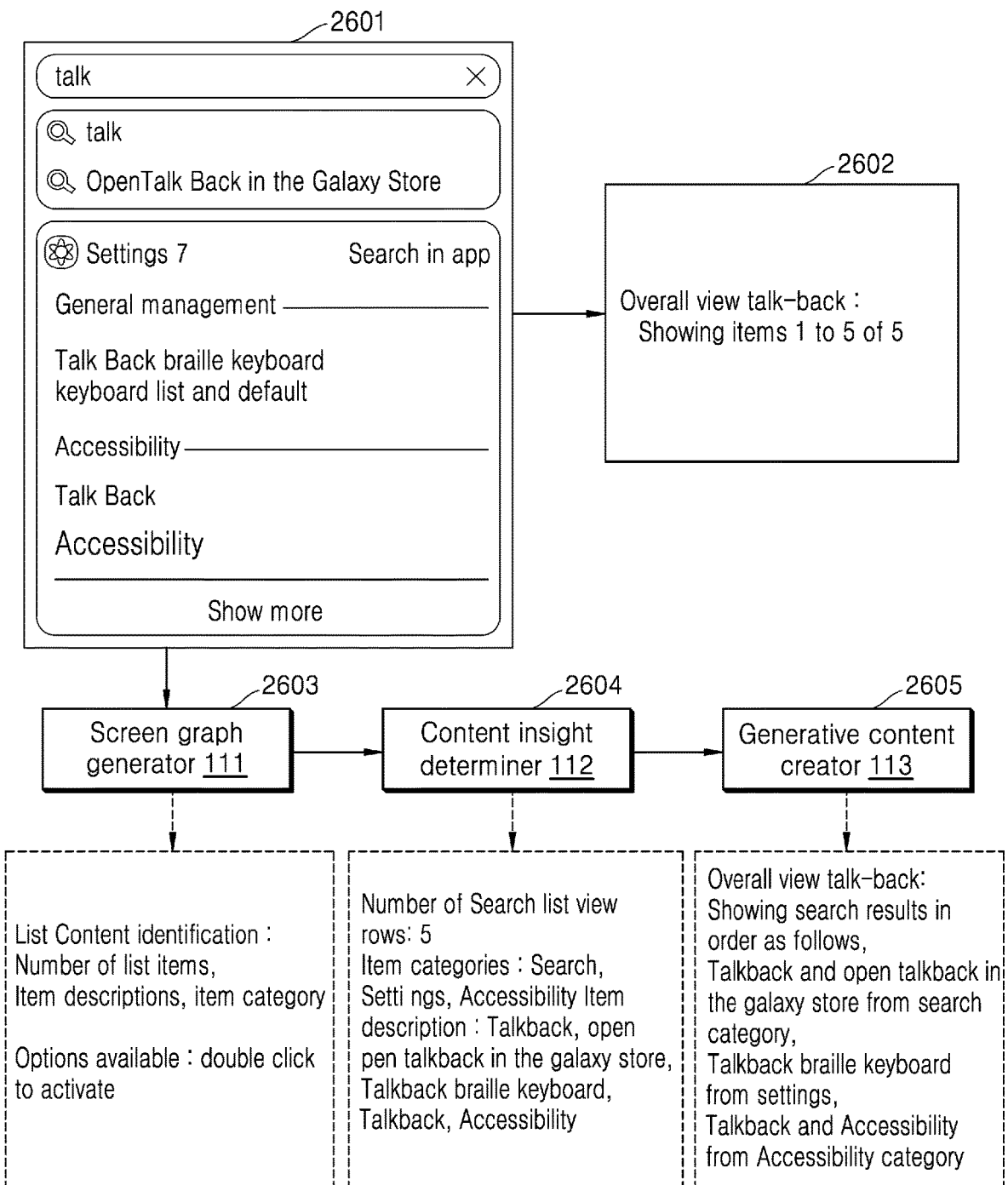
FIG. 26 illustrates a comparison of reading the contents of search results by the device of the related art and the proposed electronic device according to an embodiment of the disclosure.

FIG. 26 illustrates a comparison of reading contents of search results by a device of the related art and a proposed electronic device according to an embodiment of the disclosure.

Referring to FIG. 26, at 2601, consider the device of the related art and the proposed electronic device (100) are displaying the search results in a setting application. At 2602, the device of the related art reads aloud the overall view of the search results as "showing items 1 to 5 of 5".

Unlike to the device of the related art, at 2603 the screen graph generator (111) of the proposed electronic device (100) identifies a list of content of the search results includes number of list items, item descriptions, item category, and available options include double click to activate. At 2604, the content insight determiner (112) of the proposed electronic device (100) identifies number of search list view rows as 5, item categories as search, settings, accessibility, item description as talkback, open talkback in the galaxy store, talkback braille keyboard, talkback, and accessibility. At 2605, the generative content creator (113) of the proposed electronic device (100) reads aloud the overall view of the search results as "showing search results in order as follows, talkback and open talkback in the galaxy store from search category, talkback braille keyboard from settings, and talkback and accessibility from accessibility category.

Figure 27:
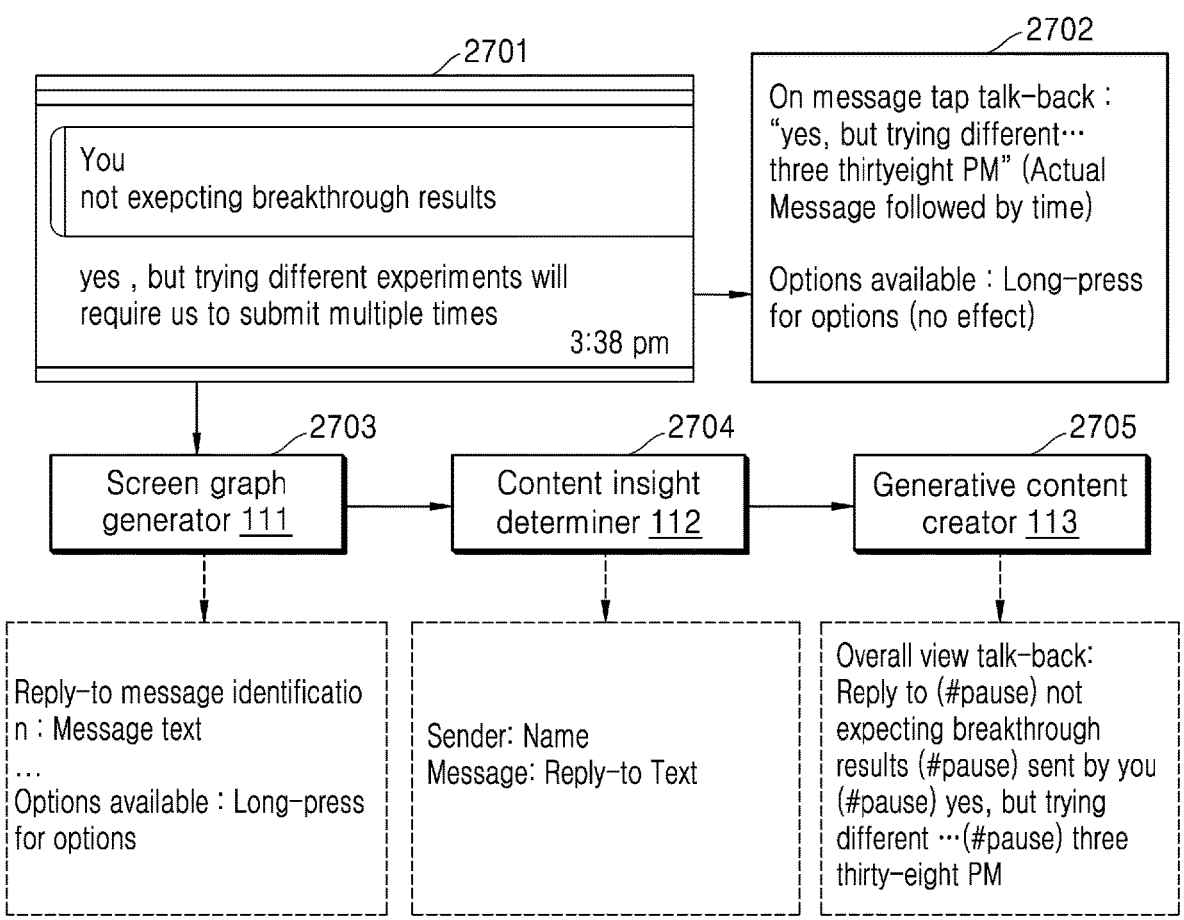
FIG. 27 illustrates a comparison of reading the contents of a reply to a chat message by the device of the related art and the proposed electronic device according to an embodiment of the disclosure.

FIG. 27 illustrates a comparison of reading contents of a reply to a chat message by a device of the related art and a proposed electronic device according to an embodiment of the disclosure.

Referring to FIG. 27, at 2701, consider the device of the related art and the proposed electronic device (100) are displaying the reply to the chat message. At 2702, the device of the related art reads aloud the overall view of the reply to the chat message as "yes, but trying different . . . three thirty-eight PM" (Actual Message followed by time)". Further, the device of the related art reads aloud without any audio effect, the available options of the chat include long-press for options.

Unlike to the device of the related art, at 2703 the screen graph generator (111) of the proposed electronic device (100) identifies the message text in the reply and the available options include long-press for options. At 2704, the content insight determiner (112) of the proposed electronic device (100) identifies a sender name of the reply and the message as the reply to the chat message. At 2705, the generative content creator (113) of the proposed electronic device (100) reads aloud the overall view of the reply to the chat message as "Reply to (#pause) not expecting breakthrough results (#pause) sent by you (#pause) yes, but trying different . . . (#pause) three thirty-eight PM". The (#pause) means giving a pause at a portion of the text where the (#pause) is given in the text while reading the text.

Figure 28:
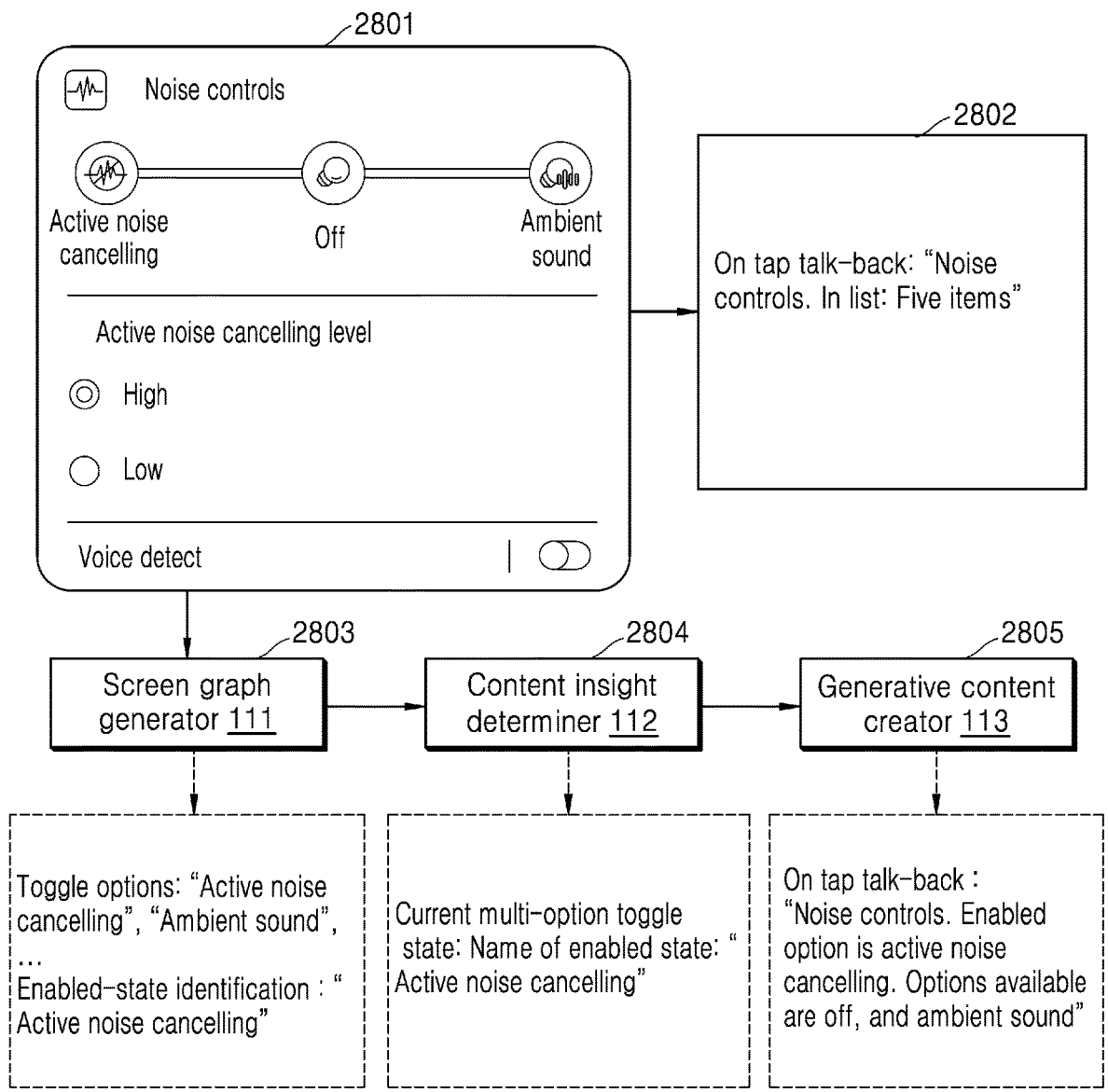
FIG. 28 illustrates a comparison of reading the contents of a noise cancelation setting by the device of the related art and the proposed electronic device according to an embodiment of the disclosure.

FIG. 28 illustrates a comparison of reading contents of a noise cancelation setting by a device of the related art and a proposed electronic device according to an embodiment of the disclosure.

Referring to FIG. 28, at 2801, consider the device of the related art and the proposed electronic device (100) are displaying the noise cancelation setting. At 2802, the device of the related art reads aloud the overall view of the noise cancelation setting as "Noise controls. In list: Five items".

Unlike to the device of the related art, at 2803 the screen graph generator (111) of the proposed electronic device (100) identifies a toggle options includes 'Active noise cancelling', 'Ambient sound', etc., and identifies that 'Active noise cancelling' is a current enabled option. At 2804, the content insight determiner (112) of the proposed electronic device (100) identifies that the current multi-option toggle state includes a name of enabled state, and the name of enabled state as the 'Active noise cancelling'. At 2805, the generative content creator (113) of the proposed electronic device (100) reads aloud the overall view of the noise cancelation setting as "Noise controls. Enabled option is active noise cancelling. Options available are off, and ambient sound".

Figure 29:
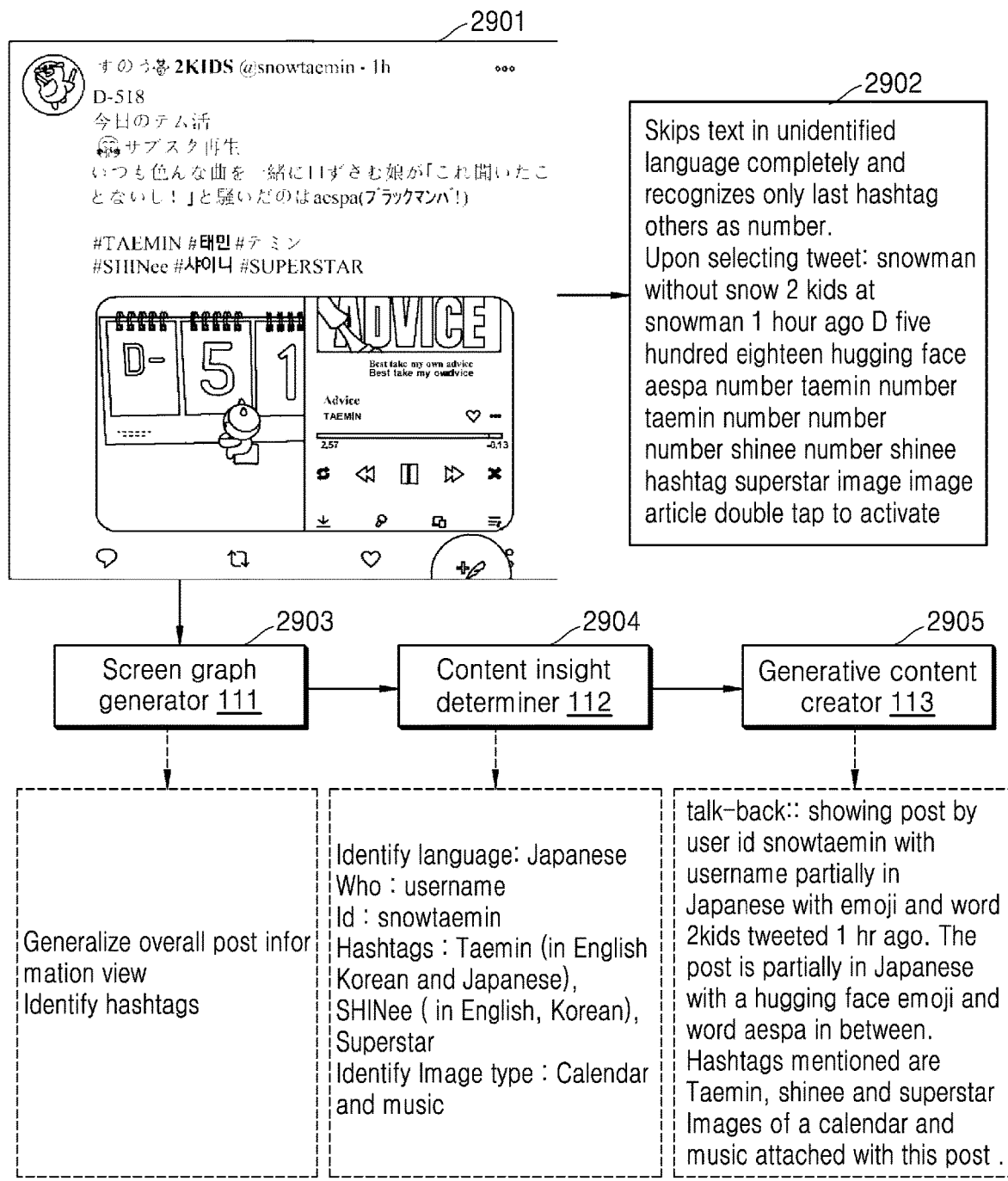
FIG. 29 illustrates a comparison of reading the contents of a post in another social media application by the device of the related art and the proposed electronic device according to an embodiment of the disclosure.

FIG. 29 illustrates a comparison of reading contents of a post in another social media application by a device of the related art and a proposed electronic device according to an embodiment of the disclosure.

Referring to FIG. 29, at 2901, consider the device of the related art and the proposed electronic device (100) are displaying the contents of the post in another social media application, where most of the text in the post are written in unidentified language to the device of the related art. At 2902, the device of the related art reads aloud the skips the text in the unidentified language completely and recognizes only last hashtag others as number. Upon selecting the post by the user, the device of the related art reads aloud as "snowman without snow 2 kids at snowman 1 hour ago D five hundred eighteen hugging face aespa number taemin number taemin number shinee number shinee hashtag superstar image article double tap to activate".

Unlike to the device of the related art, at 2903 the screen graph generator (111) of the proposed electronic device (100) identifies hashtags and generalizes overall post information view. At 2904, the content insight determiner (112) of the proposed electronic device (100) identifies the unidentified language as Japanese, username and ID of the post snowtaemin, and hashtags includes taemin in English Korean and Japanese, SHINee (in English, korean), superstar, and image type includes calendar and music. At 2905, the generative content creator (113) of the proposed electronic device (100) reads aloud the overall view of the search results as "showing post by user ID snowtaemin with username partially in Japanese with emoji and word 2 kids tweeted 1 hr ago. The post is partially in Japanese with a hugging face emoji and word aespa in between. Hashtags mentioned are Taemin, shinee and superstar. Images of a calendar and music attached with this post".

Figure 30:
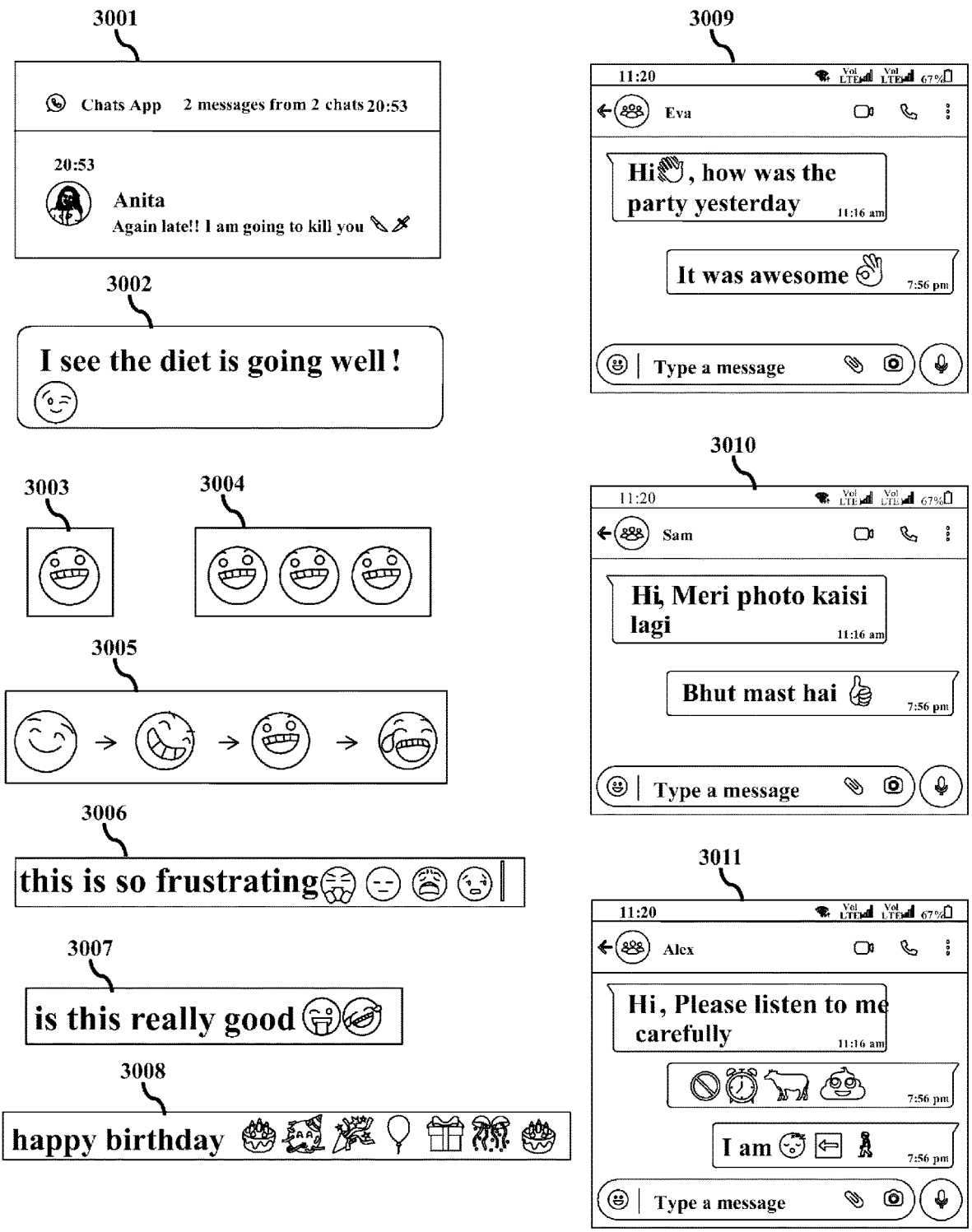
FIG. 30 illustrates different contents read by the electronic device according to an embodiment of the disclosure.

FIG. 30 illustrates different contents read by an electronic device according to an embodiment of the disclosure.

Referring to FIG. 30, as shown in 3001, a chat message includes an emoji of swords at end of a text. The electronic device (100) identifies the emoji and generates audio of cutting an object with the swords at the end of reading aloud the text.

As shown in 3002, a chat message includes an emoji of at end of a text. The electronic device (100) identifies the emotion representing the emoji and modulates audio generating while reading aloud the text based on the emotion representing the emoji.

As shown in 3002, a message includes single laughing emoji. As shown in 3003, a message includes multiple laughing emoji. As shown in 3004, the electronic device (100) generates audio of laugh in case of the single laughing emoji, whereas the electronic device (100) generates audio of exaggerate laugh in case of the multiple laughing emoji.

As shown in 3005, a message includes multiple emojis represents different types of laugh. The electronic device (100) enhances the emotion and intensity in audio of the different types of laugh.

Consider, the electronic device (100) is displaying a message a sequence of emojis as shown in 3006, then the electronic device (100) identifies the sequence of emojis and the emotion representing as per the sequence of emojis, and generates the generative text as "this is so frustrating expressed with a set of emojis conveying annoyance" based on the emotion representing as per the sequence of emojis.

Consider, the electronic device (100) is displaying a message with emojis represent a sarcastic emotion as shown in 3007, then the electronic device (100) identifies the sarcastic emotion from the emojis and generates the generative text as "is it really good expressed with a set of emojis conveying sarcasm".

Consider, the electronic device (100) is displaying a message with multiple emojis represent party, enjoyment, etc. as shown in 3008, then the electronic device (100) identifies the party, enjoyment, etc. from the emojis and generates the generative text as "happy birthday expressed with a set of emojis conveying lots of love and joy". Further, the electronic device (100) generates a sound mashup based on the generative text.

Consider, the electronic device (100) is displaying a chat between a female sender and a male recipient as shown in 3009, then the electronic device (100) identifies a gender of the sender and the recipient. Further, the electronic device (100) modulates the audio like a woman reading a received message while selecting on the received message for reading aloud. Similarly, the electronic device (100) modulates the audio like a man reading a sent message while selecting on the sent message for reading aloud.

Consider, the electronic device (100) is displaying messages with a combination of multiple languages as shown in 3010, then the electronic device (100) identifies multiple languages in the messages and modulates the audio based on an accent used for the multiple languages while selecting on the messages for reading aloud.

Consider, the electronic device (100) is displaying a set of emojis in sequence that conveys a message as shown in 3011, then the electronic device (100) identifies the message that from the emojis in sequence and generates the audio emulating the message. In the example 3011, the electronic device (100) reads the second message as "No time for bullshit", whereas the electronic device (100) reads the third message as "I am going to sleep".

According to an embodiment of the disclosure, a machine-readable storage medium or a computer readable medium may be provided in a form of a non-transitory storage medium. Here, the "non-transitory storage medium" only denotes a tangible device, not including a signal (for example, electromagnetic waves), and the term does not distinguish a case where data is stored in the storage medium semi-permanently from a case where data is stored in the storage medium temporarily. For example, the "non-transitory storage medium" may include a buffer in which data is temporarily stored.

According to an embodiment of the disclosure, a method according to various embodiments disclosed in the present specification may be provided by being included in a computer program product. The computer program product may be transacted between a seller and a purchaser, as a product. The computer program product may be distributed in a form of machine-readable storage medium (for example, a CD-ROM), or distributed (for example, downloaded or uploaded) through an application store or directly or online between two user devices (for example, smart phones). In the case of the online distribution, at least a part of the computer program product (e.g., a downloadable application) may be at least temporarily stored in a machine-readable storage medium, such as a server of a manufacturer, a server of an application store, or a memory of a relay server, or may be temporarily generated.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for intelligently reading displayed contents by an electronic device, the method comprising:
    obtaining a screen representation based on a plurality of contents displayed on a screen of the electronic device;
    extracting a plurality of insights comprising at least one of intent, importance, emotion, sound representation and information sequence of the plurality of contents from the plurality of contents based on the screen representation; and
    generating audio emulating the extracted plurality of insights,
    wherein the extracting the plurality of insights comprises:
        obtaining multimodal features comprising a text and at least one emoji based on the screen representation;
        generating multimodal embeddings based on the multimodal features; and
        classifying the multimodal embeddings into a sound label belonging to the sound representation using a deep neural network (DNN).

2. The method of claim 1, wherein the obtaining the screen representation comprises:
    obtaining a plurality of content embeddings based on the plurality of contents displayed on the screen;
    obtaining a plurality of contextual content groups based on the plurality of contents displayed on the screen; and
    obtaining the screen representation based on the plurality of content embeddings and the plurality of contextual content groups.

3. The method of claim 2, wherein the obtaining the plurality of contextual content groups comprises:
    receiving views on the screen;
    identifying importance of each of the views and a relationship between the views; and
    generating contextual content groups by grouping the views based on the importance of each of the views and the relationship between the views.

4. The method of claim 3, wherein the generating the contextual content groups by grouping the views based on the importance of each of the views and the relationship between the views comprises:
   obtaining a current view of the views;
   identifying previous child views and next child views of the current view;
   parsing the current view, the previous child views and the next child views to fetch the plurality of contents in the current view, the previous child views and the next child views;
   determining whether at least one of the current view, the previous child views and the next child views have at least one context dependent field;
   determining a relevant context from the at least one context dependent field;
   classifying the current view, the previous child views and the next child views to an important class or an unimportant class based on the relevant context; and
   grouping content of the views into the important class.

5. The method of claim 1, wherein the generating the multimodal embeddings comprises:
   generating a word embedding and a character embedding based on the text in the multimodal features;
   generating a textual embedding based on the word embedding and the character embedding;
   determining a textual definition of the at least one emoji;
   generating an emoji embedding based on the textual definition of the at least one emoji; and
   generating the multimodal embeddings based on the emoji embedding and the textual embedding.

6. The method of claim 1, wherein the classifying the multimodal embeddings into the sound label belonging to the sound representation using the DNN comprises:
   determining a similarity score of energy functions by passing the multimodal embeddings through a twin convolutional neural network with shared weights, wherein the twin convolutional neural network learns the shared weights and the similarity score by minimizing a triplet loss function; and
   classifying the multimodal embeddings into the sound label belonging to the sound representation based on the similarity score of the energy functions.

7. The method of claim 1, wherein the extracting the plurality of insights further comprises:
   generating a character embedding, a word embedding, and an emoji embedding based on the obtained screen representation;
   concatenating the character embedding, the word embedding, and the emoji embedding;
   determining intent attention, importance attention, and emotion attention and corresponding loss function of each attention based on a result of the concatenation using a stacked gated recurrent unit (GRU); and
   determining the intent, the importance, and the emotion based on the intent attention, the importance attention, and the emotion attention and corresponding loss function of each attention.

8. The method of claim 1, wherein the extracting the plurality of insights further comprises:
   determining a textual definition of multimodal features comprising a video, an image, and an emoji based on the screen representation;
   generating a word embedding and a character embedding based on the textual definition of the multimodal features;
   determining character representations based on the character embedding;
   determining word representations based on the character representations and the word embedding; and
   determining the information sequence based on the word representations.

9. The method of claim 1, wherein the generating the audio emulating the extracted plurality of insights comprises:
   determining blueprints of the plurality of contents;
   determining generative content by controlled generation of contents with style imitation from the plurality of contents based on the extracted plurality of insights and the blueprints; and
   generating the audio emulating the generative content.

10. The method of claim 9, wherein the determining the generative content by controlled generation of contents with style imitation from the plurality of contents based on the extracted plurality of insights and the blueprints comprises:
    determining contextual phrases from the plurality of contents based on intent, context, emotion, sensitivity, and sentence understanding of the plurality of contents;
    determining sound expressions for at least one emoji of the plurality of contents based on sound labels;
    determining a summary of the plurality of contents;
    determining personalized sounds based on a gender, multilingual feature, and demographics feature of a user of the electronic device; and
    generating generative content based on the extracted plurality of insights, the blueprints, the personalized sounds, the summary of the plurality of contents, the sound expressions, and the contextual phrases.

11. An electronic device for intelligently reading displayed contents, the electronic device comprising:
    a screen
    a memory storing one or more instruction; and
    at least one processor configured to execute the one or more instructions stored in the memory to:
       obtain a screen representation based on a plurality of contents displayed on a screen of the electronic device;
       extract a plurality of insights comprising at least one of intent, importance, emotion, sound representation and information sequence of the plurality of contents from the plurality of contents based on the screen representation; and
       generate audio emulating the extracted plurality of insights,
    wherein the one or more instructions to extract the plurality of insights are further configured to:
       obtain multimodal features comprising a text and at least one emoji based on the screen representation;
       generate multimodal embeddings based on the multimodal features; and
       classify the multimodal embeddings into a sound label belonging to the sound representation using a deep neural network (DNN).

12. The electronic device of claim 11, wherein the one or more instructions to obtain the screen representation are further configured to:
    obtain a plurality of content embeddings based on the plurality of contents displayed on the screen;
    obtain a plurality of contextual content groups based on the plurality of contents displayed on the screen; and
    obtain the screen representation based on the plurality of content embeddings and the plurality of contextual content groups.

13. The electronic device of claim 12, wherein the one or more instructions to obtain the plurality of contextual content groups are further configured to:
receive views on the screen;
identify importance of each of the views and a relationship between the views; and
generate contextual content groups by grouping the views based on the importance of each of the views and the relationship between the views.

14. The electronic device of claim 13, wherein the one or more instructions to generate the contextual content groups by grouping the views based on the importance of each of the views and the relationship between the views are further configured to:
obtain a current view of the views;
identify previous child views and next child views of the current view;
parse the current view, the previous child views and the next child views to fetch the plurality of contents in the current view, the previous child views and the next child views;
determine whether at least one of the current view, the previous child views and the next child views have at least one context dependent field;
determine a relevant context from the at least one context dependent field;
classify the current view, the previous child views and the next child views to an important class or an unimportant class based on the relevant context; and
grouping content of the views into the important class.

15. The electronic device of claim 12, wherein the one or more instructions to generate the multimodal embeddings are further configured to:
generate a word embedding and a character embedding based on the text in the multimodal features;
generate a textual embedding based on the word embedding and the character embedding;
determine a textual definition of the at least one emoji;
generate an emoji embedding based on the textual definition of the at least one emoji; and
generate the multimodal embeddings based on the emoji embedding and the textual embedding.

16. The electronic device of claim 12, wherein the one or more instructions to the classifying the multimodal embeddings into the sound label belonging to the sound representation using the DNN are further configured to:
determine a similarity score of energy functions by passing the multimodal embeddings through a twin convolutional neural network with shared weights, wherein the twin convolutional neural network learns the shared weights and the similarity score by minimizing a triplet loss function, and
classify the multimodal embeddings into the sound label belonging to the sound representation based on the similarity score of the energy functions.

17. The electronic device of claim 12, wherein the one or more instructions to extract the plurality of insights are further configured to:
generate a character embedding, a word embedding, and an emoji embedding based on the obtained screen representation;
concatenate the character embedding, the word embedding, and the emoji embedding;
determine intent attention, importance attention, and emotion attention and corresponding loss function of each attention based on a result of the concatenation using a stacked gated recurrent unit (GRU); and
determine the intent, the importance, and the emotion based on the intent attention, the importance attention, and the emotion attention and corresponding loss function of each attention.

18. A non-transitory computer readable medium containing instructions that when executed cause at least one processor to:
obtain a screen representation based on a plurality of contents displayed on a screen of an electronic device;
extract a plurality of insights comprising at least one of intent, importance, emotion, sound representation and information sequence of the plurality of contents from the plurality of contents based on the screen representation; and
generate audio emulating the extracted plurality of insights,
wherein the extracting of the plurality of insights includes:
obtaining multimodal features comprising a text and at least one emoji based on the screen representation;
generating multimodal embeddings based on the multimodal features; and
classifying the multimodal embeddings into a sound label belonging to the sound representation using a deep neural network (DNN).

* * * * *